(12) United States Patent
Soffer

(10) Patent No.: US 10,515,234 B2
(45) Date of Patent: Dec. 24, 2019

(54) METHOD AND APPARATUS FOR SECURING KVM MATRIX

(71) Applicant: High Sec Labs LTD., Yokneam industrial zone (IL)

(72) Inventor: Aviv Soffer, Caesarea (IL)

(73) Assignee: HIGH SEC LABS LTD., Yokneam Industrial Zone (IL)

( * ) Notice: Subject to any disclaimer, the term of this patent is extended or adjusted under 35 U.S.C. 154(b) by 130 days.

(21) Appl. No.: 15/437,931

(22) Filed: Feb. 21, 2017

(65) Prior Publication Data
US 2018/0239719 A1 Aug. 23, 2018

(51) Int. Cl.
*G06F 21/83* (2013.01)
*G06F 13/10* (2006.01)
*G06F 21/86* (2013.01)
*G06F 13/40* (2006.01)

(52) U.S. Cl.
CPC ............ *G06F 21/83* (2013.01); *G06F 13/105* (2013.01); *G06F 13/4022* (2013.01); *G06F 21/86* (2013.01)

(58) Field of Classification Search
CPC ....... G06F 13/4022; G06F 21/83; G06F 21/86
See application file for complete search history.

(56) References Cited

U.S. PATENT DOCUMENTS

| 6,324,605 B1* | 11/2001 | Rafferty | G06F 13/4022 710/100 |
| 6,388,658 B1* | 5/2002 | Ahern | G06F 13/4022 345/1.1 |
| 7,284,278 B2* | 10/2007 | Anson | G06F 21/83 345/156 |
| 8,769,172 B2* | 7/2014 | Soffer | G06F 3/023 710/64 |
| 2005/0044266 A1* | 2/2005 | O'Neil | G06F 3/023 709/238 |
| 2015/0020189 A1* | 1/2015 | Soffer | G06F 21/85 726/16 |
| 2015/0365237 A1* | 12/2015 | Soffer | G06F 21/85 726/20 |

OTHER PUBLICATIONS

IHSE Product Catalog 2015-2016, available from www.ihse.com/fileadmin/redakteur/pdf/IHSE_Product_Catalog_2015-2016.pdf.
Soffer, "High Security Labs Secure KVM and Matrix Security Target", see "www.niap-ccevs.org/st/st_vid10701-st.pdf" (20160.
AG Matrix NOC, www.aten.com/ext_data/global_en/application_note/AG_Matrix_NOC.pdf.

(Continued)

*Primary Examiner* — Robert B Leung
*Assistant Examiner* — Carlos M De Jesus Lassala
(74) *Attorney, Agent, or Firm* — Browdy and Neimark, PLLC

(57) ABSTRACT

A method for securing a KVM Matrix system by inserting a plurality of input security isolators, each of the input security isolators is placed between a host computer and matrix host adapter of the KVM matrix system to enforce security data flow policy that is applicable for the corresponding host computer. Additionally, a security filter is placed between peripheral devices and a matrix console adapter to enforce security data flow policy that is applicable for the corresponding peripheral devices.

23 Claims, 18 Drawing Sheets

(56) References Cited

OTHER PUBLICATIONS

Best Practices KVM Video Routing Secure Facilities White Paper (2013), www.appliedelectronics.com/documents/Best_Practices_KVM_Video_Routing_Secure_Facilities_White_Paper.pdf.
Protection Profile for Peripheral Sharing Switch, NIAP-CCEVS-pp_pss_v3.0 (2015).
Think Logical Security Target (Aug. 2013), sertit.no/dokumenter/201311/ThinklogicalSecurityTarget_1_4_VX640.pdf.

* cited by examiner

Device White-list — 202

| # | Class ID | Sub-class | Protocol | VID | PID | S/N | Map to | Dir |
|---|---|---|---|---|---|---|---|---|
| 1 | 0Bh – Smart-card | 01h | 01h | 054e | 0752 | * | + + + + | N N R W |
| 2 | | | | | | | | |
| 3 | | | | | | | | |

220a

Device Black-list

| # | Class ID | Sub-class | Protocol | VID | PID | S/N | Map to | Dir |
|---|---|---|---|---|---|---|---|---|
| 1 | 08h – Mass storage | 02h | 02h | 051e | 0750 | * | | N N N N |
| 2 | | | | | | | | |
| 3 | | | | | | | | |

220b

Device Read

| # | Class ID | Sub-class | Protocol | VID | PID | S/N | Map to | Dir |
|---|---|---|---|---|---|---|---|---|
| 1 | | | | | | | | |
| 2 | | | | | | | | |
| 3 | | | | | | | | |

METHOD AND APPARATUS FOR SECURING KVM MATRIX

FIELD

The disclosed subject matter relates to a method and apparatus that enhances the security of KVM (Keyboard Video Mouse) matrix. More specifically the disclosed subject matter relates to a KVM matrix having multiple security isolator functions located at its inputs and outputs. Security isolator functions are designed to mitigate the security risks that exists today in many of the KVM matrix systems.

BACKGROUND

KVM Matrix are in common use in certain applications that requires large number of users to interact with large number of computers. Applications such as Command and Control centers, Air Traffic Control, Marine control, Broadcasting, NOC (Network Operating Centers) and emergency services are examples for such applications. KVM Matrix enables dynamic switching of computer resources to users to support the dynamic needs of each user and to enable recovery from different scales of failures. In the past KVM Matrix used analog data switching. As analog signals are prone to quality degradation and limited in bandwidth, today most KVM Matrix switches digital signals. Switching digital signals can make use of proprietary serial digital protocols or may rely on standard IP (Internet Protocol) frames to carry the different computer interface signals. The use of high-speed CATX cables optical fibers in KVM Matrix systems enables co-location of the computer resources from the users. This setup enables more scalable and control deployment of computers and easier deployment of users over large sites. Another reason for such co-location is the heat and the noise generated by modern computers and the lack of space near the users.

KVM Matrix are typically controlled by their users that request access certain computing resources based on directory services (for example Microsoft Active Directory) through specific keyboard switching commands that detected by the KVM Matrix. Larger KVM Matrix may have specific users called directors, administrators or managers that controls the whole site.

KVM Matrix host transmitters or adaptors typically digitized the computer generated video and audio. As the resolutions and color depth of video is ever increasing, faster than KVM Matrix fabric bandwidth, video compression—decompression is used. KVM Matrix receivers or console adaptors are used to decompress the video and audio streams and generate standard video and analog audio output to drive the user display and speakers or headphones. Matrix receivers or console adaptors also digitize the user microphone audio input and the user keyboard and mouse commands. The resulted serial stream is routed back to the KVM Matrix host transmitters or adaptors to interface with the corresponding computer.

In February 2015 NIAP (the US National Information Assurance Partnership) has released a new standard for KVM Switches and Matrix called: "Protection Profile for Peripheral Sharing Switch Version 3.0". This standard adopted by the Common Criteria organization, offered a way to evaluate and test existing or new products to assure mitigation against the discovered types of data leakages. Since this standard released, no vendor was able to certify its existing product against this new standard as prior-art products are lacking some of the basic security mechanisms required by the standard.

IHSE GmbH, Maybachstraße 11, 88094 Oberteuringen, Germany, is a leading European developer and manufacturer of advanced KVM devices, IHSE develops and manufactures switches for operating and switching between computers and consoles, as well as extenders for visually lossless signal transmission, with 30 years of experience.

Some details of their products may be found in the IHSE Product Catalog 2015-2016, available from "www.ihse.com/fileadmin/redakteur/pdf/IHSE_Product_Catalog_2015-2016.pdf".

In particular, page 9 discuss security challenges in KVM Matrix systems

U.S. Government Approved Protection Profile—Protection Profile for Peripheral Sharing Switch Version 3.0" is available from "www.niap-ccevs.org/Profile/Info.cfm?id=368".

"High Security Labs Secure KVM and Matrix Security Target", see: "www.niap-ccevs.org/st/st_vid10701-st.pdf". Aten is a leading Asian developer and manufacturer of KVM Matrix systems. ATEN "Application Guide—Matrix KVM Solution for Network Operating Center (NOC)" discloses the company view of various characteristics (including security) of their KVM matrix products. See: "www.atencom/ext_data/global_en/application_note/AG_Matrix_NOC.pdf"

Thinklogical is a leading US developer and manufacturer of KVM Matrix systems. Thinklogical Press Release "Thinklogical Achieves Common Criteria Accreditation for Fiber-Optic KVM Matrix Switches" discloses the evaluation process of the prior-art KVM Matrix systems made by the company against the now obsolete Peripheral Sharing Switch Protection Profile. Published documents such as the Security Target of this evaluation discloses the prior-art set of threats and security features used by Thinklogical. In another document from the same company: Thinklogical White Paper "Recommended Best Practices for the Design of Secure Multi-Domain KVM and Video Routing Systems", the company discloses its view of KVM Matrix security threats and their mitigation offered by the different company products. See: "www.appliedelectronics.com/documents/Best_Practices_KVM_Video_Routing_Secure_Facilities_White_Paper.pdf".

Thinklogical document "KVM Matrix Switch Routers Product Manual covering the following models: VX40, VX80, VX160, VX320, VX320VIDEO & VX320AUDIO" provides technical information about prior-art KVM Matrix products offered by the company.

Thinklogical document "Thinklogical VX640 Router KVM Matrix Switch Security Target Document Version 1.4" discloses the VX640 KVM Matrix system sets security assumptions and security functions based on the now obsolete Peripheral Sharing Switch Protection Profile version 2.1. See: "sertit.no/dokumenter/201311/ThinklogicalSecurityTarget_1_4_VX640.pdf"

SUMMARY OF THE EMBODIMENTS

The present subject matter relates to a method and apparatus that enhances the security of KVM Matrix systems. More specifically the present subject matter relates to KVM Matrix architecture that reduces the risks evolved with data leakages between host computers connected to the KVM matrix.

For many years the biggest security concern with the use of such KVM Matrix related to user and administrator permissions. As users and sessions may have different security attributes, the concerns related primarily to users that are not authorized to access certain data that somehow may access it. Another concern was user spoofing—a situation wherein users are being exploited by an external trying to display a screen similar to classified login screen in an attempt to get the classified user credentials.

Over the last few years, High Sec Labs ltd conducted several large scale analysis that discovered wider security vulnerabilities in KVM switches and Matrix. These security vulnerabilities evolved data leakages through the KVM Matrix between connected computers. The potential security impact of such data leakages is much bigger than any other type of security breach as some computers may be connected to external network or to the internet. This allows external attacker to access classified assets inside critical organizations. The demonstration of such attack modes on prior-art KVM Switches and Matrix systems started a commercial competitions to develop security enhanced KVM Switches and Matrix.

Another change in the set of security threats that evolves KVM Matrix introduced with the appearance of social attacks that relied on malicious USB devices. Such devices may be used to penetrate into networks isolated from the outside (air-gapped) to install viruses and malicious agents.

What is needed is a KVM Matrix that effectively prevents potential data leakages between connected computers and users. As large KVM Matrix requires significant development investments and typically sold in small number, it is preferable that the security enhancements/changes will have minimal effect and cost impact on the developed system.

According to an exemplary embodiment, a Secure KVM Matrix system is provided comprising:
at least one KVM Matrix fabric having:
a plurality of inputs,
each of said inputs is for communicating via at least one high-speed serial data streams with a corresponding host computer;
a plurality of outputs,
each of said outputs is for communicating via at least one high-speed serial data streams with corresponding peripheral devices, said peripheral devices comprising:
a) Human Interface Devices (HID) such as keyboard and mouse, and
b) a display,
said KVM matrix fabric is constructed to route at least one of said inputs to one or more of said outputs;
a plurality of matrix host adapters,
each one of said matrix host adapters is connected to a corresponding one of said inputs of said KVM Matrix fabric,
each one of said Matrix host adapters is constructed to convert all peripheral devices interfaces data flowing to and from said corresponding host computer into one or more high-speed serial data streams compatible with the said KVM Matrix fabric;
a plurality of matrix console adapters,
each one of said matrix console adapters is connected to a corresponding one of said output said KVM Matrix fabric,
each one of said matrix console adapters is constructed to convert all peripheral device interfaces data flowing to and from said corresponding peripheral devices into one or more high-speed serial data streams compatible with the said KVM Matrix fabric;
a plurality of input security isolators,
each of said input security isolators is placed between said corresponding host computer and said corresponding Matrix host adapter,
wherein each of said input security isolators is constructed to enforce security data flow policy that is applicable for said corresponding host computer; and
a plurality of output security isolators,
each of said output security isolators is placed between said corresponding peripheral devices and said corresponding matrix console adapter,
wherein each of said output security isolators is constructed to enforce security data flow policy that is applicable for said corresponding peripheral devices.

In some embodiments the input security isolators and the output security isolator are having the same block diagram.

In some embodiments the input security isolators and the output security isolator are having the same hardware chipset.

In some embodiments the input security isolators and the output security isolator are identical.

In some embodiments the input security isolator and the output security isolator each further comprise an EDID data diode to physically enforce video plug and play data to flow only from said corresponding display to said corresponding host computer.

In some embodiments the output security isolator further comprises:
a) an HID Host emulator to emulate a computer in front of the corresponding user HID devices; and
b an HID device emulator to emulate standard USB HID device in front of said corresponding matrix console adapter.

In some embodiments the input security isolator further comprises:
a) an HID Host emulator to emulate a computer in front of the corresponding matrix host adapters; and
b) an HID device emulator (82) to emulate standard USB HID device in front of said corresponding host computer.

In some embodiments the input security isolator and the output security isolator further comprise an HID data diode connected between said HID host emulator and said HID device emulator to enforce HID data flow only from said host emulator to said device emulator.

In some embodiments the input security isolator and the output security isolator each further comprise a raw video data diode to physically enforce raw video data flow only from said corresponding host computer to said corresponding user peripherals.

In some embodiments the input security isolator and the output security isolator each further comprises a General Purpose USB channel constructed to filter connected USB devices based on predefined USB device whitelist and blacklist.

In some embodiments the General Purpose USB channels in said corresponding input security isolator and said output security isolator, each further comprises encryption/decryption function constructed to create a secure tunnel between said corresponding input security isolator and said corresponding output security isolator which are coupled via said KVM Matrix fabric by authenticating both said corresponding security isolators and encrypting the USB packets between said corresponding security isolators.

In some embodiments the General Purpose USB channel further comprises interface to the HID Host emulator to enable encryption/decryption of the user HID data.

In some embodiments the General Purpose USB channel further comprises a USB audio CODEC to deliver audio data to and from said corresponding host computer through the KVM Matrix fabric over USB packets.

In some embodiments the input security isolator and the output security isolator each further comprises a management LAN interface to enable functions selected from the group consisting of: monitoring, configuration, automatic deployment warnings generation, pairing, and security keys distribution.

In some embodiments the input security isolators, the output security isolators, the matrix host adapters, and the matrix console adapters are formed as removable cards.

In some embodiments at least one input security isolators is electrically and mechanically coupled to a matrix host adapter; and at least one output security isolators is electrically and mechanically coupled to a matrix console adapter.

In some embodiments an input security isolator and a matrix host adapter are integrated into a single unit formed as removable card; and In some embodiments an output security isolator and a matrix console adapter are integrated into a single unit formed as removable card.

In some embodiments the HID device emulator is programmed to:

a) block all standard keyboard typing commands; and b) pass all and only predefined special keyboard combination required to perform KVM Matrix commands.

In some embodiments the HID device emulator is configured to be paired with and authenticate only with specific USB devices based on serial numbers of said specific USB devices.

In some embodiments the HID device emulator is configured to be paired with and authenticate only with prequalified high security keyboard and mouse.

It is another aspect of an exemplary embodiment described herein to teach a method for securing a KVM Matrix system is provided comprising:

at least one KVM Matrix fabric having:

a plurality of inputs, each of said inputs is for communicating via at least one high-speed serial data streams with a corresponding host computer; a plurality of outputs, each of said outputs is for communicating via at least one high-speed serial data streams with corresponding peripheral devices, said peripheral devices comprising: a) Human Interface Devices (HID) such as keyboard and mouse, and b) a display, said KVM matrix fabric is constructed to route at least one of said inputs to one or more of said outputs;

a plurality of matrix host adapters, each one of said matrix host adapters is connected to a corresponding one of said inputs of said KVM Matrix fabric, each one of said Matrix host adapters is constructed to convert all peripheral devices interfaces data flowing to and from said corresponding host computer into one or more high-speed serial data streams compatible with the said KVM Matrix fabric;

a plurality of matrix console adapters, each one of said matrix console adapters is connected to a corresponding one of said output said KVM Matrix fabric, each one of said matrix console adapters is constructed to convert all peripheral device interfaces data flowing to and from said corresponding peripheral devices into one or more high-speed serial data streams compatible with the said KVM Matrix fabric;

by performing the step of:

inserting a plurality of input security isolators, each of said input security isolators is placed between said corresponding host computer and said corresponding Matrix host adapter, wherein each of said input security isolators is constructed to enforce security data flow policy that is applicable for said corresponding host computer; and inserting a plurality of output security isolators, each of said output security isolators is placed between said corresponding peripheral devices and said corresponding matrix console adapter, wherein each of said output security isolators is constructed to enforce security data flow policy that is applicable for said corresponding peripheral devices.

In some embodiments the method further comprises enforcing video plug and play data to flow only from said corresponding display to said corresponding host computer.

In some embodiments the method further comprises emulating a computer in front of the corresponding user HID devices; and emulating a standard USB HID device in front of said corresponding matrix console adapter.

In some embodiments the method further comprises emulating a computer in front of the corresponding matrix host adapters; and emulating standard USB HID device in front of said corresponding host computer.

In some embodiments the method further comprises enforcing HID data flow only from said host emulator to said device emulator.

In some embodiments the method further comprises enforcing raw video data flow only from said corresponding host computer to said corresponding user peripherals.

In some embodiments the method further comprises filtering connected USB devices based on predefined USB device whitelist and blacklist.

In some embodiments the method further comprises encrypting and decrypting data to create a secure tunnel between said corresponding input security isolator and said corresponding output security isolator which are coupled via said KVM Matrix fabric by authenticating both said corresponding security isolators and encrypting the USB packets between said corresponding security isolators.

In some embodiments the method further comprises encrypting user HID data.

In some embodiments the method further comprises interfacing a management LAN interface to enable functions selected from the group consisting of: monitoring, configuration, automatic deployment warnings generation, pairing, and security keys distribution.

According to yet another exemplary embodiment, a security filter for securing a KVM Matrix system for securing a KVM Matrix system is provided comprising:

at least one host emulator; and at least one device emulator, coupled to said at least one host emulator, wherein:

said security isolator is constructed to be placed between a host computer and a Matrix host adapter, wherein the security isolators is constructed to enforce security data flow policy that is applicable for said host computer.

In some embodiments the security filter for securing a KVM Matrix system is further constructed to be placed between peripheral devices and a matrix console adapter, wherein the security isolator is constructed to enforce security data flow policy that is applicable for said corresponding peripheral devices.

Unless otherwise defined, all technical and scientific terms used herein have the same meaning as commonly understood by one of ordinary skill in the art to which this subject matter belongs. Although methods and materials similar or equivalent to those described herein can be used in the practice or testing of the embodiments, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current subject matter or its embodiments.

BRIEF DESCRIPTION OF THE OF THE DRAWINGS

Some embodiments are herein described, by way of example only, with reference to the accompanying drawings. With specific reference now to the drawings in detail, it is stressed that the particulars shown are by way of example and for purposes of illustrative discussion of the preferred embodiments of the present subject matter only, and are presented in the cause of providing what is believed to be the most useful and readily understood description of the principles and conceptual aspects of the disclosed subject matter. In this regard, no attempt is made to show structural details of the embodiments in more detail than is necessary for a fundamental understanding of the disclosed subject matter, the description taken with the drawings making apparent to those skilled in the art how the several forms may be embodied in practice.

In the drawings:

FIG. 1 schematically illustrates a block diagram of a typical KVM or KVM over IP Matrix system as known in the prior art.

Figure 8:
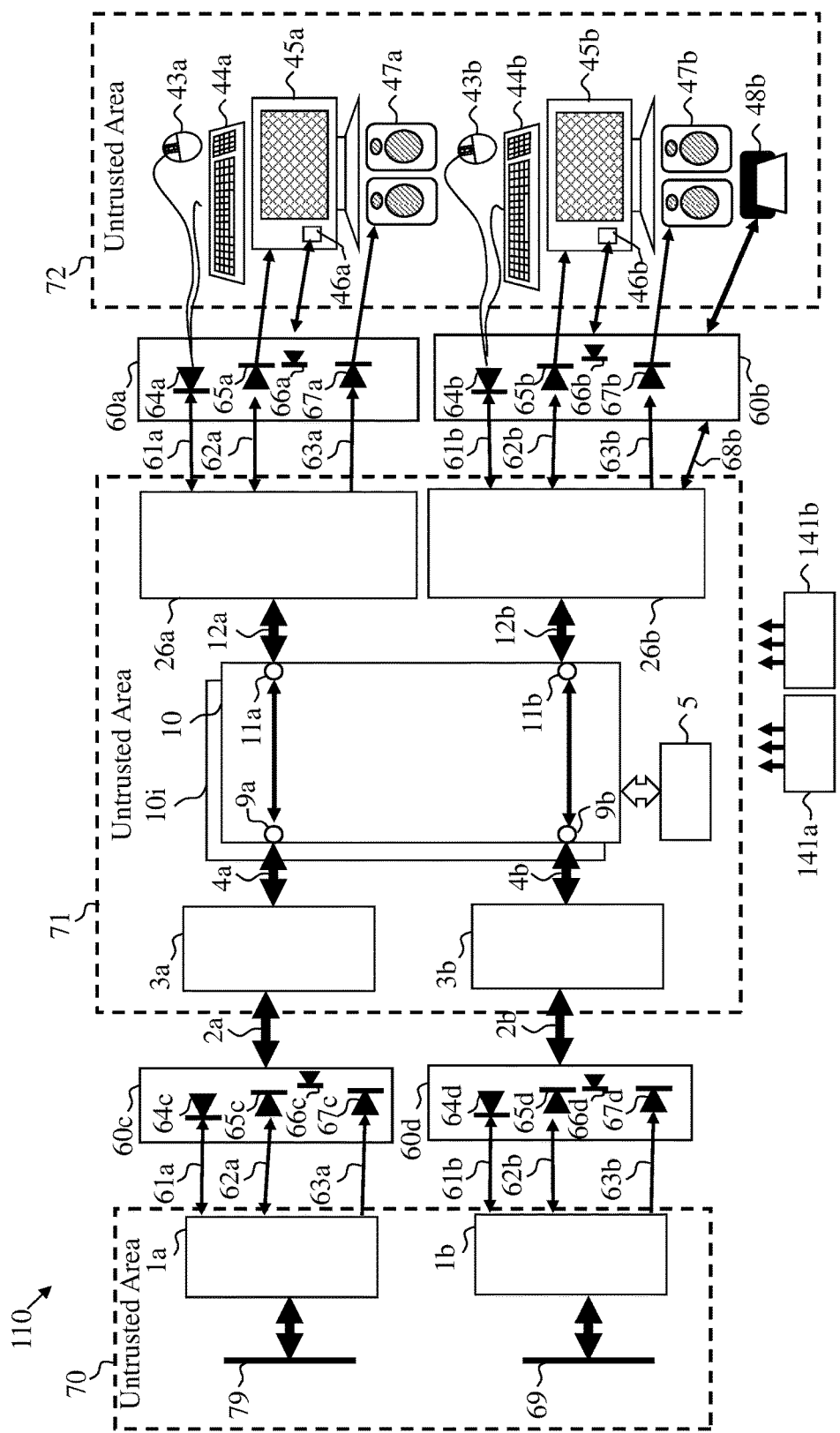

FIG. 8 schematically illustrates security enhanced KVM Matrix system according to an exemplary embodiment.

Figure 9:
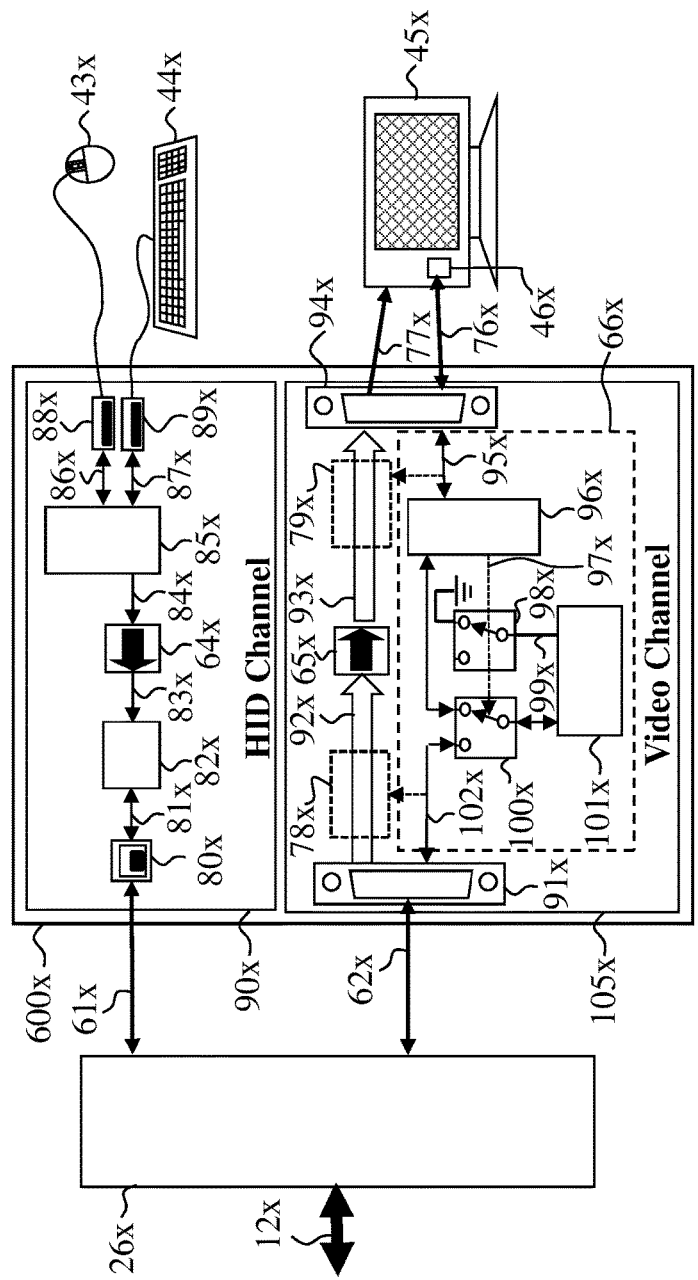

FIG. 9 schematically illustrates security isolator placed at the output ports of enhanced KVM Matrix system according to an exemplary.

Figure 10:
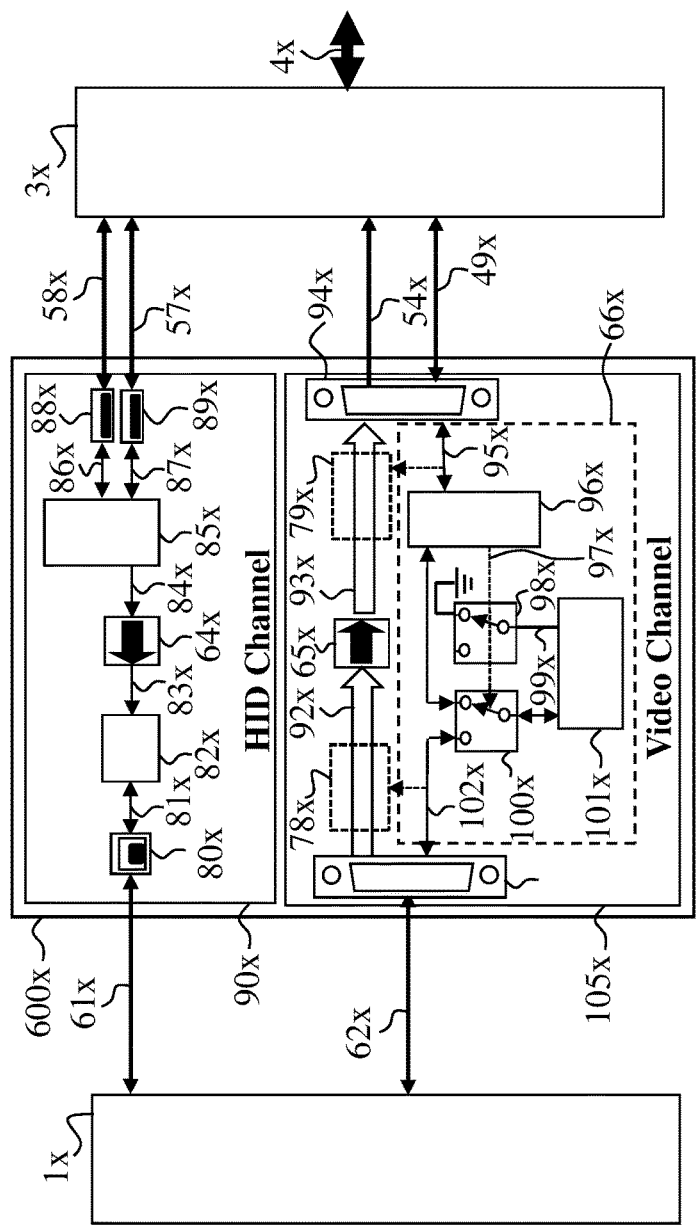

FIG. 10 schematically illustrates security isolator placed at the input ports of enhanced KVM Matrix system according to an exemplary.

Figure 11:
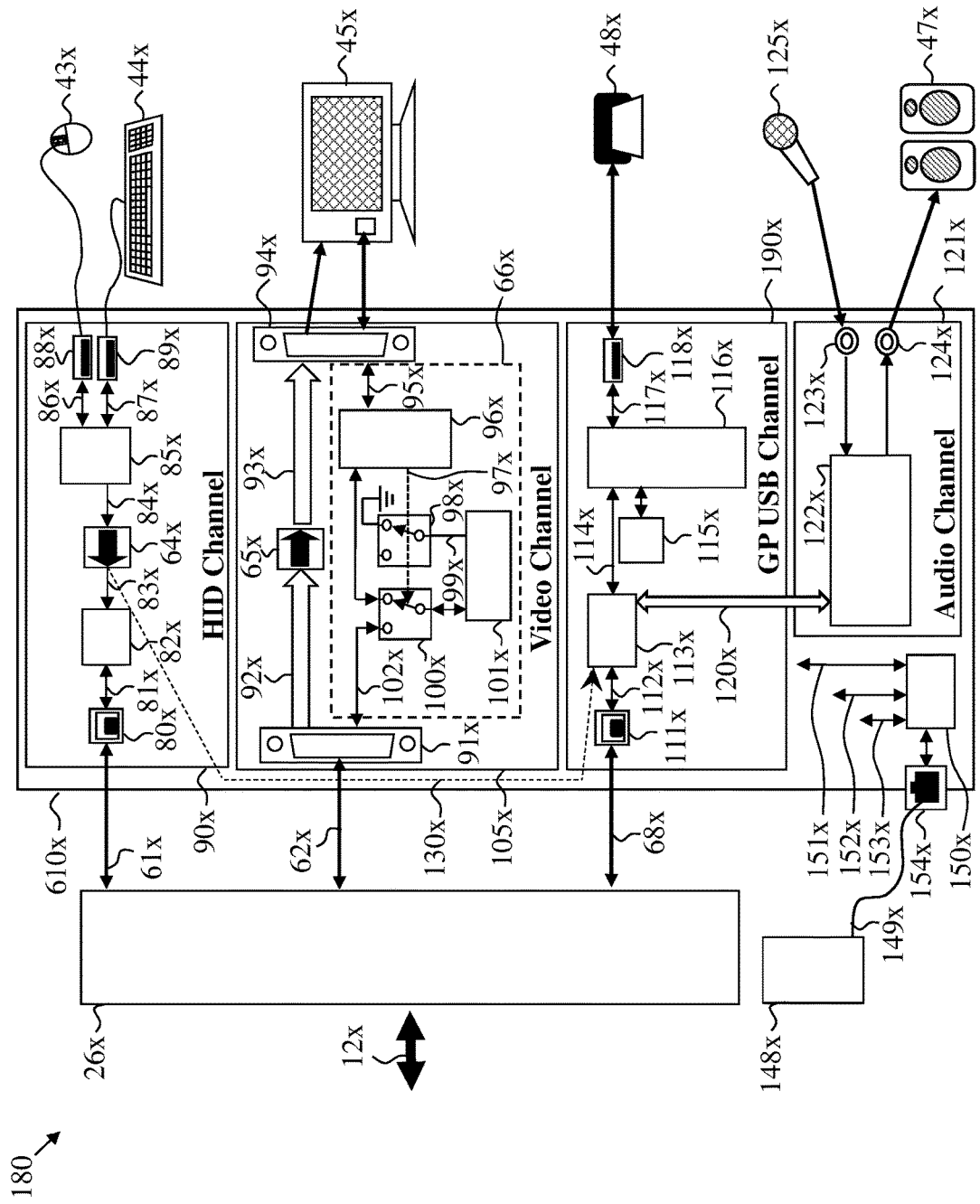

FIG. 11 schematically illustrates security isolator placed at the output ports of another enhanced KVM Matrix system according to an exemplary.

Figure 12:
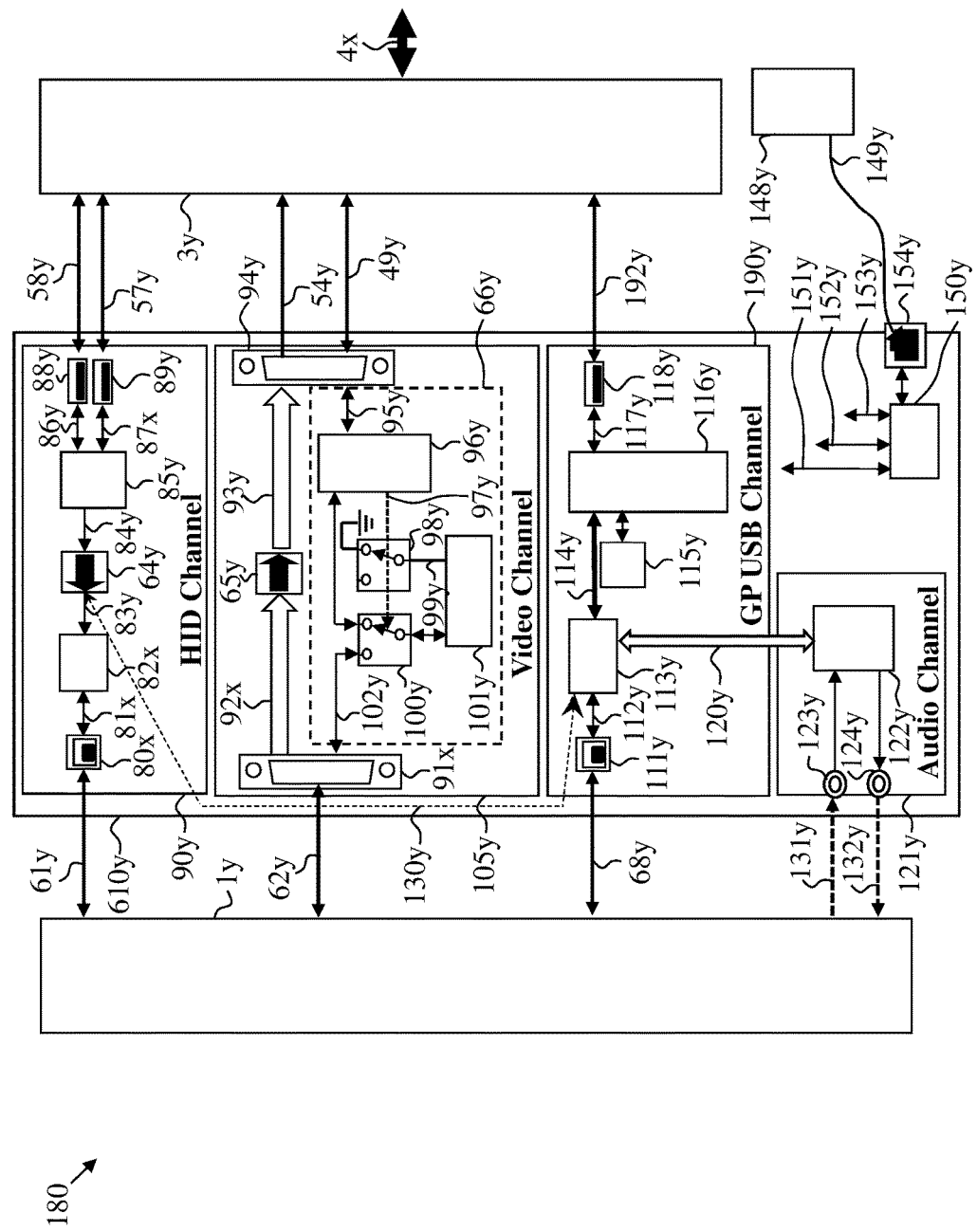

FIG. 12 schematically illustrates security isolator placed at the input ports of another enhanced KVM Matrix system according to an exemplary embodiment.

Figure 13:
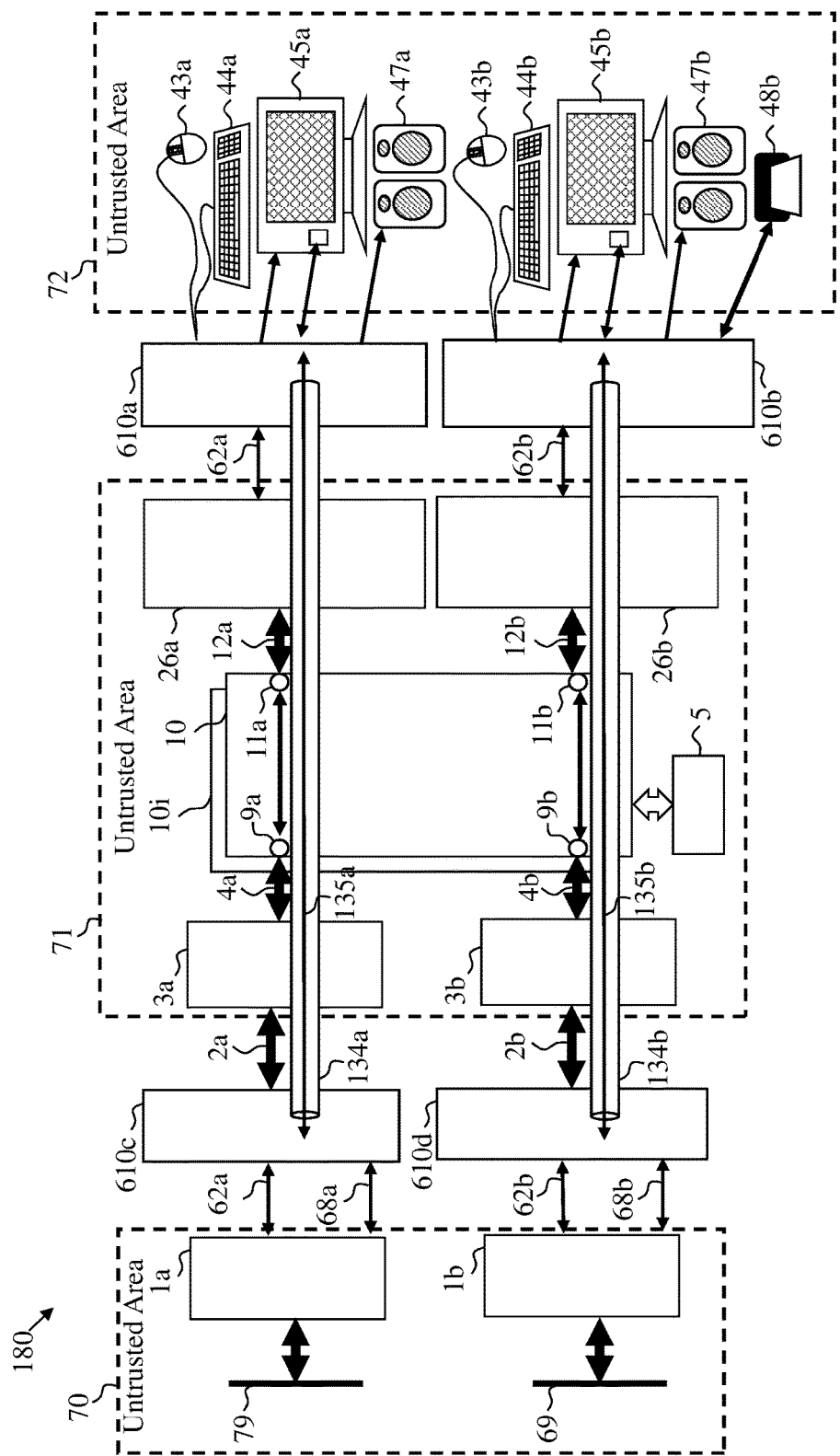

FIG. 13 schematically illustrates the security enhanced KVM Matrix system shown in FIGS. 11 and 12 above according to an exemplary embodiment with further details about the GP USB channel encryption.

Figure 14:
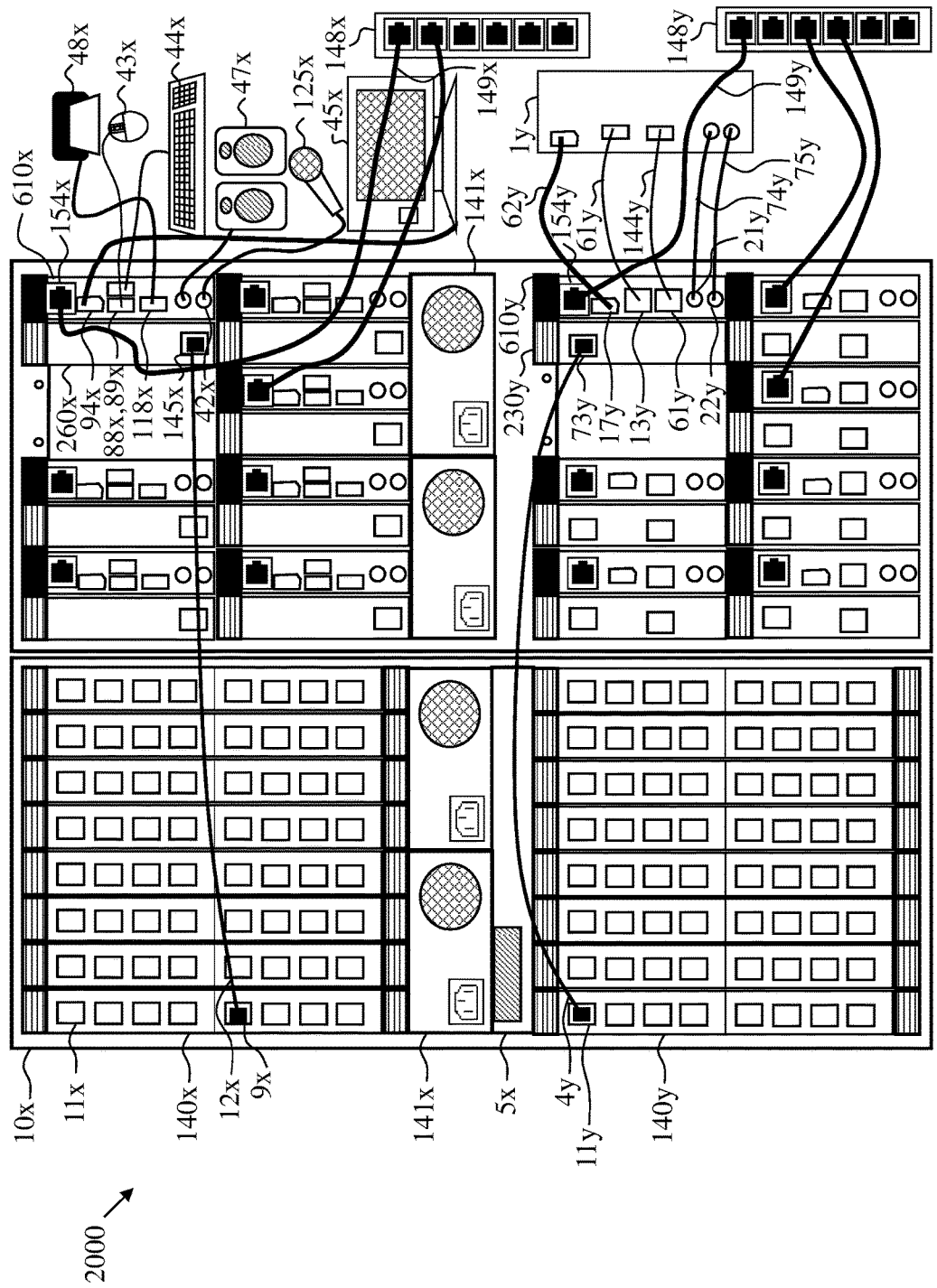

FIG. 14 illustrates the typical physical layout of a security enhanced KVM Matrix system as shown schematically in FIGS. 8 to 13 above.

FIG. 15 schematically Illustrates the configuration utility screen used define the USB devices allowed by the secure isolator GP USB channel in accordance to an exemplary embodiment.

Figure 16:
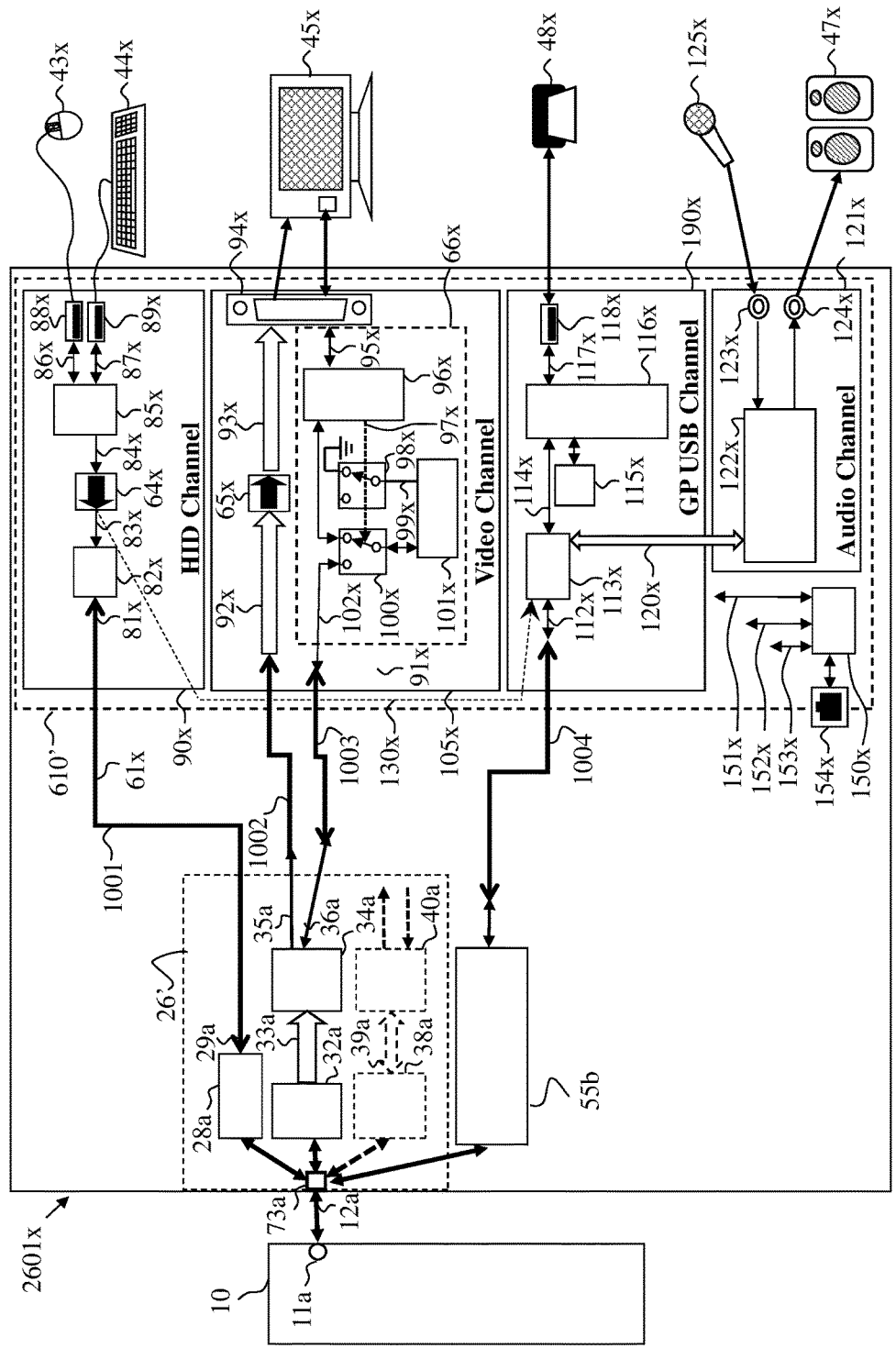

FIG. 16 schematically illustrates a single secure Matrix console adapter combining the functions of Matrix console adapter and security isolator according to another exemplary embodiment.

Figure 17:
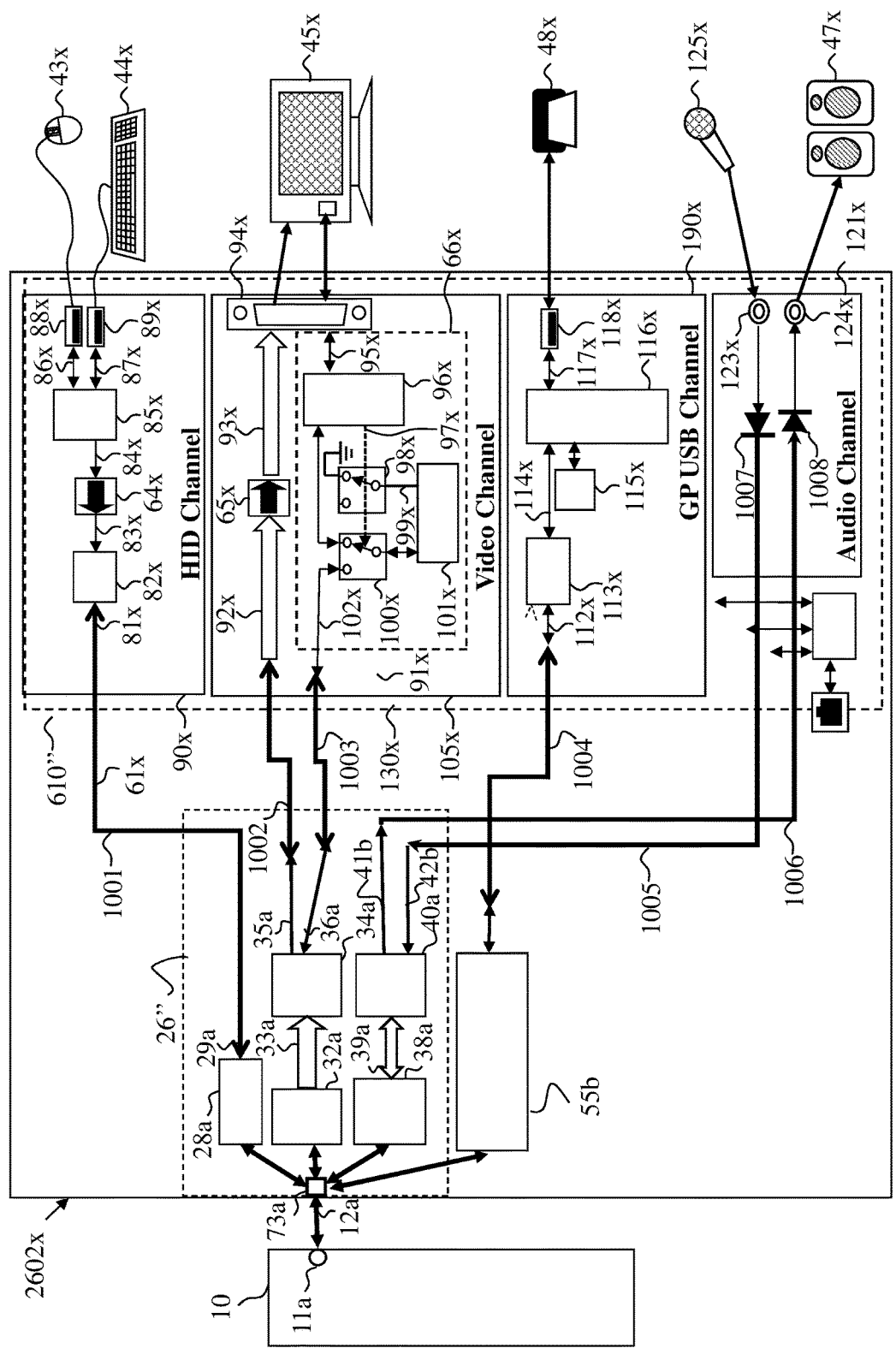

FIG. 17 schematically illustrates a single secure Matrix console adapter combining the functions of Matrix console adapter and security isolator according to yet another exemplary embodiment.

DETAILED DESCRIPTION OF THE DRAWINGS

Before explaining at least one embodiment in detail, it is to be understood that the current subject matter is not necessarily limited in its application to the details set forth in the following description or exemplified by the examples. The subject matter is capable of other embodiments or of being practiced or carried out in various ways.

It will be appreciated that certain features, which are, for clarity, described in the context of separate embodiments, may also be provided in combination in a single embodiment. Conversely, various features, which are, for brevity, described in the context of a single embodiment, may also be provided separately or in any suitable sub-combination or as suitable in any other described embodiment. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand-alone programs, may be incorporated as subroutines in an operating system, may be functions in an installed software package, and the like.

Figure 1:
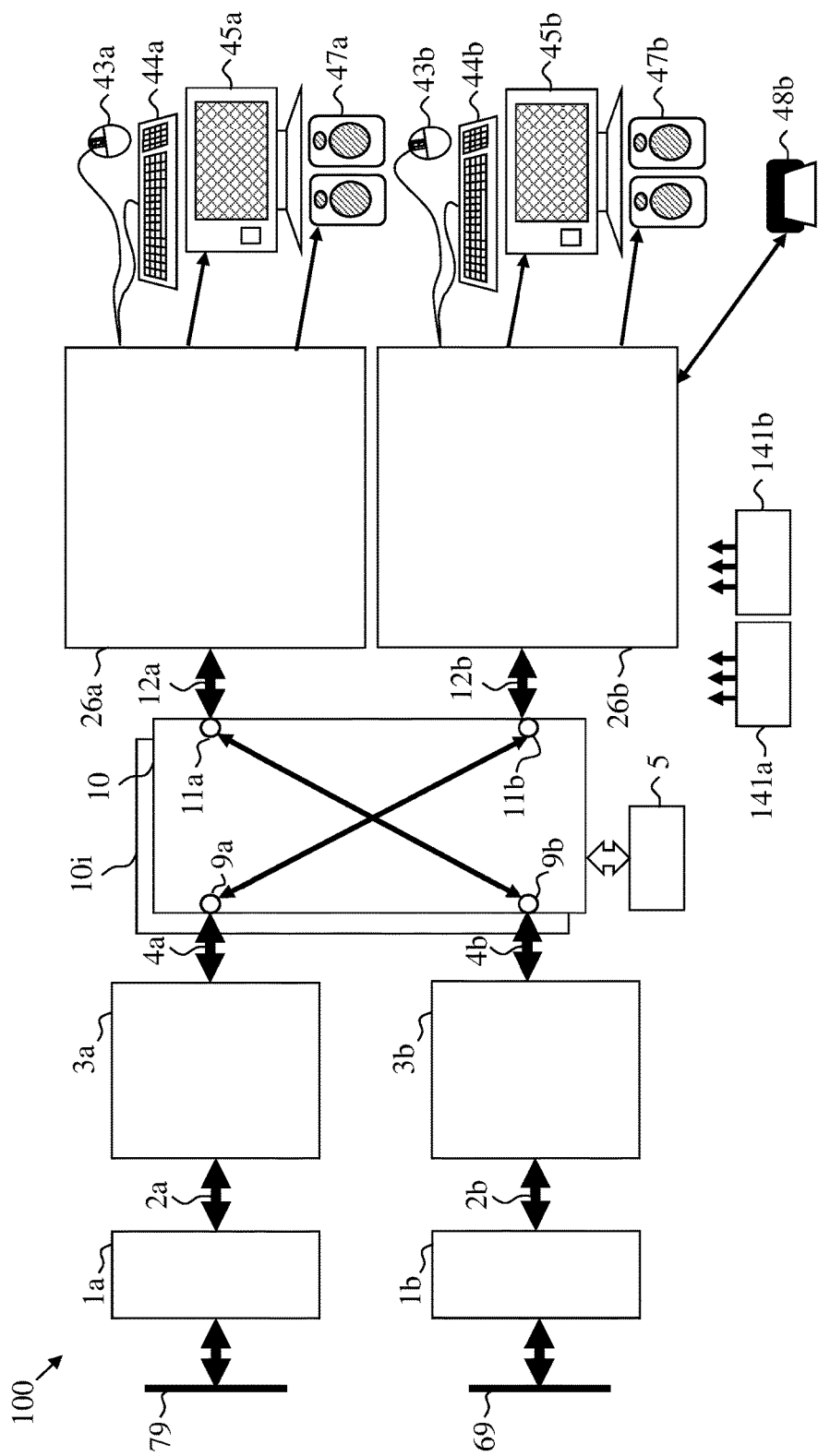

FIG. 1 schematically illustrates a block diagram of a typical KVM or KVM over IP Matrix system 100 as known in the prior art. Only 2:2 (two inputs to two outputs) port matrix shown here for clarity. In reality such matrix may comprise of hundreds of input and output ports. It may also contain redundant components for fast disaster recovery and fail-safe operation. For example in this figure two AC/DC power supplies are shown 141*a* and 141*b*. Matrix system 100 components may be powered by both AC/DC power supplies 141*x* or by a single power supply in case of a power source or power supply failure.

In this figure, Computers 1*x* are PC, thin-client or server blade.

In these figures, the letter "x" when follows an element number (as in 1x herein, which stands for 1a and 1b seen in FIG. 1) may stand for any letter such as (a, b, c . . . ) to identify any one of a plurality of identical or similar elements, all having the same element numeral.

In typical large KVM matrix installations, multiple computers are being available to support multiple users switched by one or more KVM Matrix. KVM Matrix may be cascaded to extend the number of supported computers 1x and user. Such connected computers 1x may be coupled to different networks and have different security attributes or levels. For example computer 1b may be coupled to the internet or other non-secure network 69 while computer 1a may be connected to top-secret network 79.

Standard computer peripheral interfaces 2x such as USB, DVI, Analog audio etc. are being used to couple computers 1x to their respective Matrix host adapter 3x. Matrix host adapter 3a may be a CPU unit card, module, or appliance. Matrix host adapter 3x interface between the user peripheral devices and the high-speed serial data stream being switched. Matrix host adapter 3x is coupled to a Matrix fabric function 10 through serial data cable 4x that contains video, audio, control and USB data. Serial data cable 4x may flow through proprietary high-speed cables or through standard cables such as CATx Ethernet cables, or Coaxial cable. Serial data may further use fiber optical line/s to further extend the link distance using single-mode fiber or multi-mode fiber optical cable.

The Matrix fabric function 10 is typically a PCBA (Printed Circuit Board Assembly), module or appliance having one or more silicon chips that route input ports (9x) to output ports (11x) based on commands received from matrix controller 5. Note that the terms inputs and outputs as used herein do not necessarily refer to the direction of data flow. Two headed arrows in the figures indicating that data may flow bi-directionally between inputs and outputs. Most KVM matrix fabric functions 10 in use today are high-speed digital non-blocking and symmetric (inputs may be outputs and vise-versa). KVM Matrix fabric function is typically further comprises of input equalizer before input port 9x and output pre-emphasis coupled to its output ports 11x.

Equalizers and output pre-emphasis are devices known in the art that are used for compensate and to correct for transmission lines (copper and fiber) imperfections. Example can be found in: www.maximintegrated.com/en/app-notes/index.mvp/id/5045

KVM Matrix fabric function 10 may route any input 9x to any one or more output 11y. This function may be implemented on FPGA, ASIC, microcontroller or computer. Matrix fabric function 10 may also implemented as LAN switch in the case that data stream 4x is in the form of standard IP packets. In the example shown in FIG. 1, matrix fabric function 10 input port 9a is routed to output port 11b. Similarly matrix fabric function 10 input port 9b is routed to output port 11a. An example for such chip is Microsemi VSC3340-31 3.5 Gbps 40×40 Crosspoint Switch.

Multiple KVM Matrix fabric functions may be installed in a single prior-art system 100 as indicated by the additional instance 10i. This is done in order to achieve higher system 100 redundancy and scalability.

Matrix fabric serial data input port 9x may be implemented in the form of SFP cage (Small Form-factor Pluggable (SFP), a compact, hot-pluggable transceiver) that can host for example a CATx transceiver module or fiber optic transceiver module.

Matrix fabric serial data output port 11x may be implemented in the form of SFP cage that can host CATx transceiver module or fiber optic transceiver module.

Matrix controller function 5 is a microcontroller, ASIC, FPGA or Computer Board that is used to manage the matrix fabric function 10. It is typically managed using computer program that provides web-based management or remote PC management functionality. Management typically includes the assignment of computer sources 1x to users (sets of peripheral devices). Matrix controller function 5 may be integrated inside another function microcontroller or FPGA.

It should be noted here that the use fiber optic link between the matrix fabric function 10 and the Matrix host adapter 3x enables splitting the system 100 over a very large distance (up to tens of kilometers apart).

It should be noted here that in many KVM matrix implementations, the inputs 9x and the outputs 11x are interchangeable and may be configured by matrix software management tools to provide additional operational redundancy and flexibility.

Matrix serial data output interface 12x couples the matrix fabric function 10 output port 11x with its corresponding Matrix console adapter 26x. Matrix console adapter 26x may be a card, module or appliance or KVM extender console. This interface 12x contains video, audio, control and bidirectional USB data. It should be noted that HID (Human Interface Device) data may be sent as standard USB packets or alternatively may be sent as proprietary HID specific serial data. Serial data may flow through proprietary high-speed cables or through standard cables such as CATx Ethernet cables, or Coaxial cable. Serial data may use fiber optical lines to further extend the link distance using single-mode fiber or multi-mode fiber.

Matrix console adapter 26x is further coupled to the user's desktop peripheral devices such as: the user mouse or other pointing device 43x, the user keyboard 44x, one or more user display/s 45x, the user speakers or headphones 47x and the user authentication device or other USB device 48x. Some KVM matrix currently in the market are using chipsets from Icron (data can be found in www.icron.com/pdf/usb-2-0-ranger-2201-datasheet.pdf). This chip supports wide range of USB devices including cameras, printers, biometric readers and mass storage devices.

Figure 2:
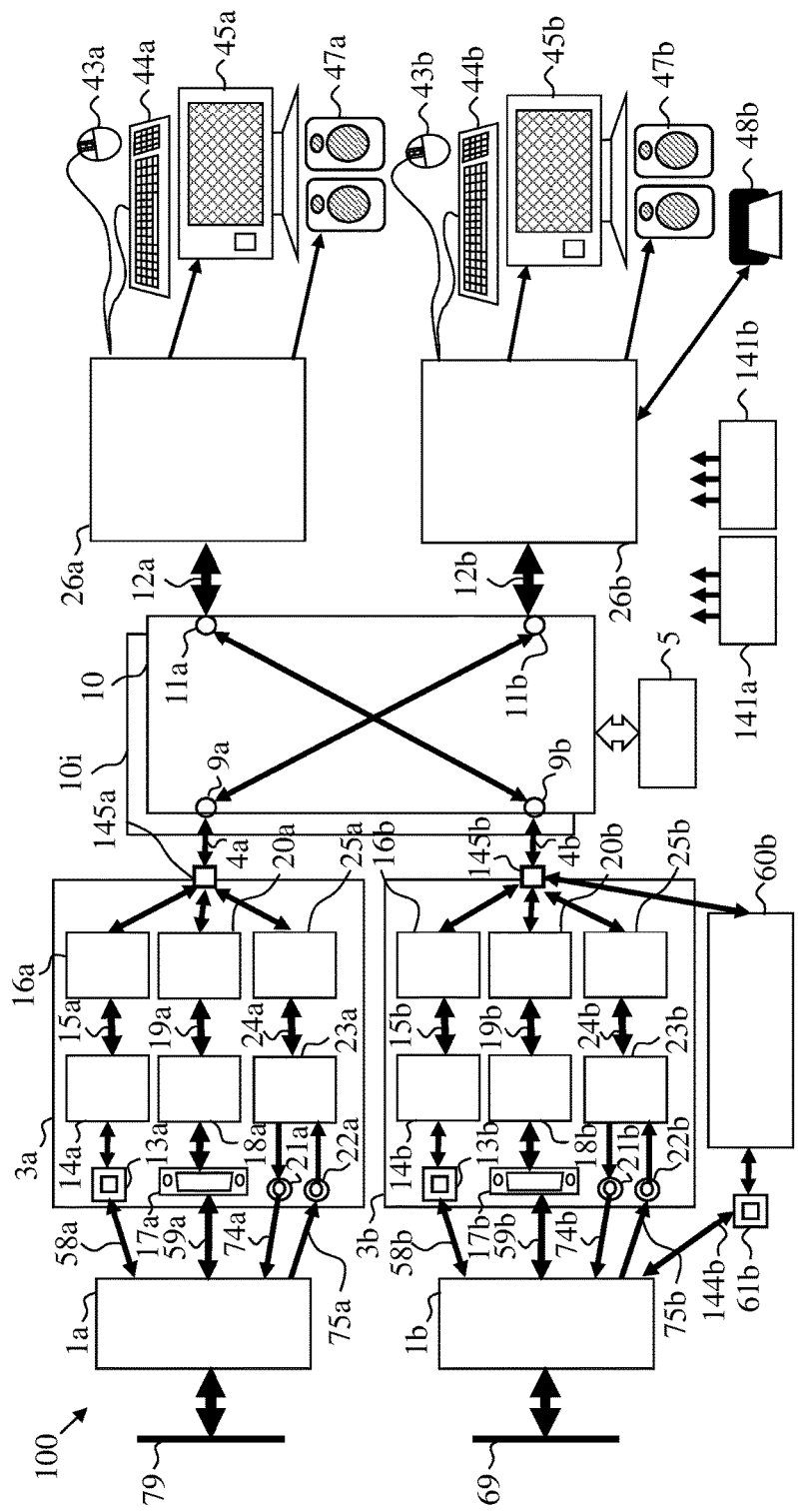
FIG. 2 illustrates the same KVM Matrix system of FIG. 1 above with further detailed internal structure of the Matrix CPU unit, card, module, or appliance.

FIG. 2 illustrates the block diagram of the same KVM Matrix system 100 of FIG. 1 above with further detailed internal structure of the Matrix host adapters 3x.

Matrix host adapter 3x is coupled to the matrix fabric function 10 input port 9x through serial cable 4x made of copper or fiber optical links. Serial cable 4x is connected to high-speed serial data connector 145x that designed to interface with the serial cable 4x. High-speed serial data connector 145x may be CATx jack, SFP cage or any other high-speed serial interface connector or coupler. The internal channels inside the Matrix host adapter 3x are all coupled to the high-speed serial data connector 145x directly or indirectly through a function that separate the different streams (for example an FPGA with high-speed transceivers).

Matrix host adapters 3x is typically comprising of a special routable channel to support the user HID (such as keyboard and mouse).

USB Type-B interface 13x enable connection of computer 1x USB ports to the user peripheral devices through USB standard USB Type-A to USB Type-B cables 58x. USB Type-B interface 13x is coupled to the USB Physical layer function 14x that receives and transmits standard USB packets. USB Physical layer 14x is coupled with the USB Physical layer interface 15x to the USB HID emulator 16x. USB HID emulator, which may be a Microcontroller, FPGA or ASIC, serves as USB HID (Human Interface Device) emulator to enable local emulation of the user keyboard and mouse functions. This local emulation of the keyboard and mouse enumerating by computer 1x as standard USB keyboard and mouse and receive remote keyboard and mouse events from the routed user keyboard 44x and user mouse 43x device respectively. Same local emulation of keyboard may be used to transmit certain keyboard states to the routed user keyboard 44x such as Caps Lock, Num Lock and Scroll Lock LED states.

Matrix host adapter 3x is further comprises or one or more video channels to support one or more user displays. Video input port 17x is typically a standard HDMI, DVI, DisplayPort or VGA interface, Video cable 59x is used to connect the computer's (1x) one or more display video output ports. Video input port 17x is coupled to the video receiver 18x. Video receiver 18x receives standard video format and convert it into a parallel digital video interface 19x is standard or proprietary format such as:

Parallel LCD TTL interface
24/30/36-bit RGB/YCbCr 4:4:4;
16/20/24-bit YCbCr 4:2:2;
8/10/12-bit YCbCr 4:2:2 (BT.656);
12/15/18-bit dual-edge clocking; and
BTA-T1004 protocol.

This interface is further coupled to the Video encoder function 20x. This function converts the incoming video interface 19x parallel signals into a compressed serial video stream output that may be routed through the matrix fabric function 10. It should be noted here that multiple duplications of the function described above will be needed to support multiple user displays.

Depending on the video protocol supported, matrix adaptor 3x may further comprises of circuitry to emulate the EDID EEPROM of the one or more connected display/s. This circuitry is needed in order to support video protocols such as VGA, DVI and HDMI.

Matrix host adapter 3x is further comprises or one or more analog audio channels to support one or more audio user peripheral devices.

Microphone output port 21x enables connection of computer 1x microphone input to the Matrix host adapter 3x through shielded audio cable 74x. This output port is typically in the form of standard 3.5 mm stereo jack. Audio input port 22x enables connection of computer 1x audio output through another shielded audio cable 75x to the Matrix host adapter 3x. This input port is also typically in the form of standard 3.5 mm stereo jack. Both audio output 21x and input 22x are coupled to the audio CODEC function 23x. This function includes all audio analog front end functions such as audio mixer, Analog to Digital and Digital to analog functions. The audio CODEC function 23x bi-directional digital interface 24x is typically standard I²S protocol (Inter-IC Sound). This interface is coupled to the audio processor function 25x that is being used to compress incoming audio output data stream and also to decompress remote microphone input data stream transmitted from remote the user microphone.

Matrix host adaptor 3x may also comprising of an optional internal or external General Purpose USB channel. Optional USB Type-B interface 61x connected to the computer 1x USB port through USB cable 144x. GP USB device emulator 60x receives serialized USB data from high-speed serial data connector 145x and uses this data to form the required USB devices in front of the connected computer 1x.

Figure 4:
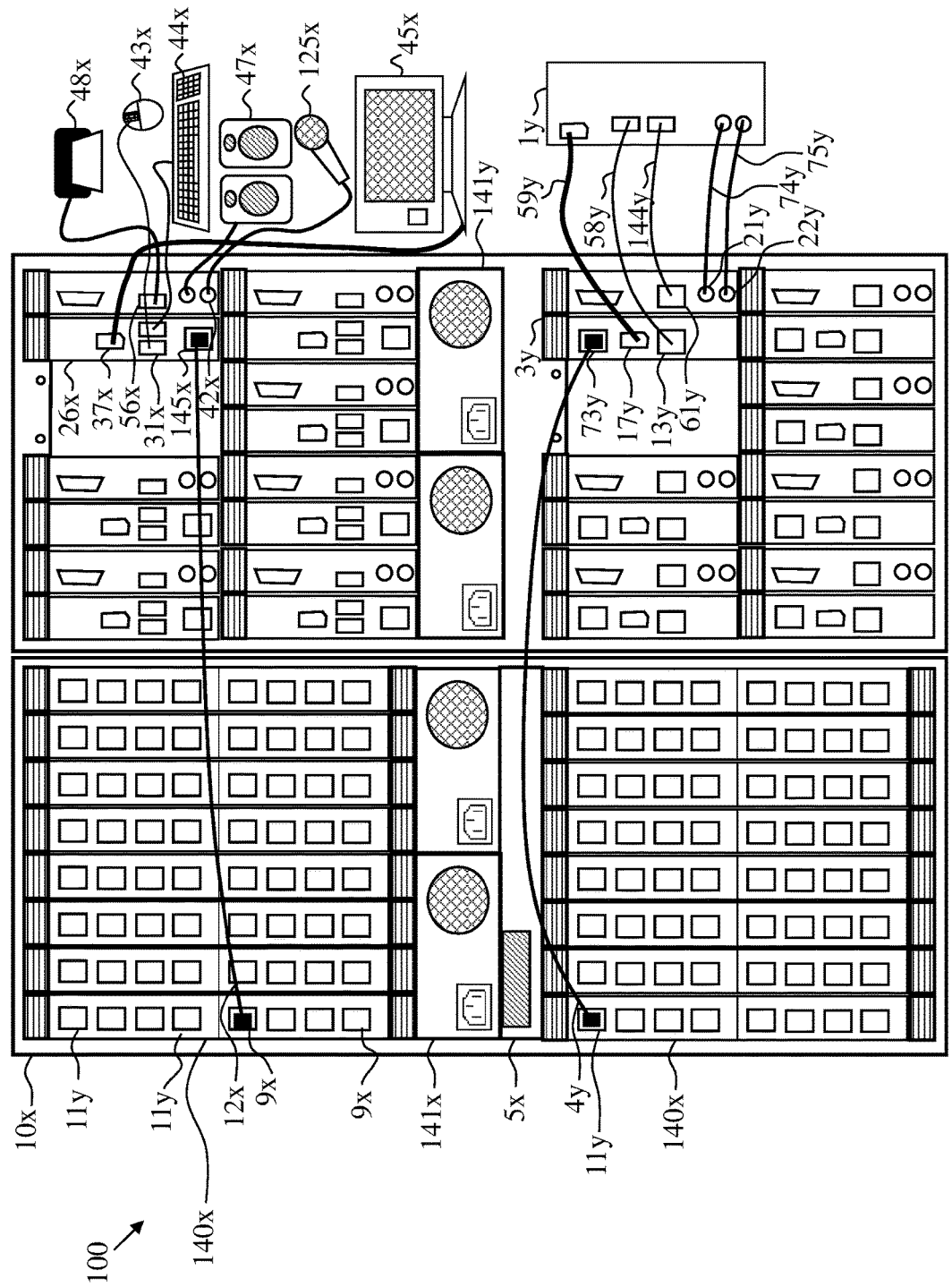
FIG. 4 illustrates the typical physical layout of a KVM Matrix system known in the art as shown schematically in FIGS. 1 to 3 above.

It should be noted that the optional audio CODEC function 23x and its related input and output circuitry and the optional General Purpose USB functions 60x and 61x may be integrated inside the Matrix host adaptor 3x same removable card or module or may be added as an optional modular card or appliance as shown in FIG. 4 below.

Figure 3:
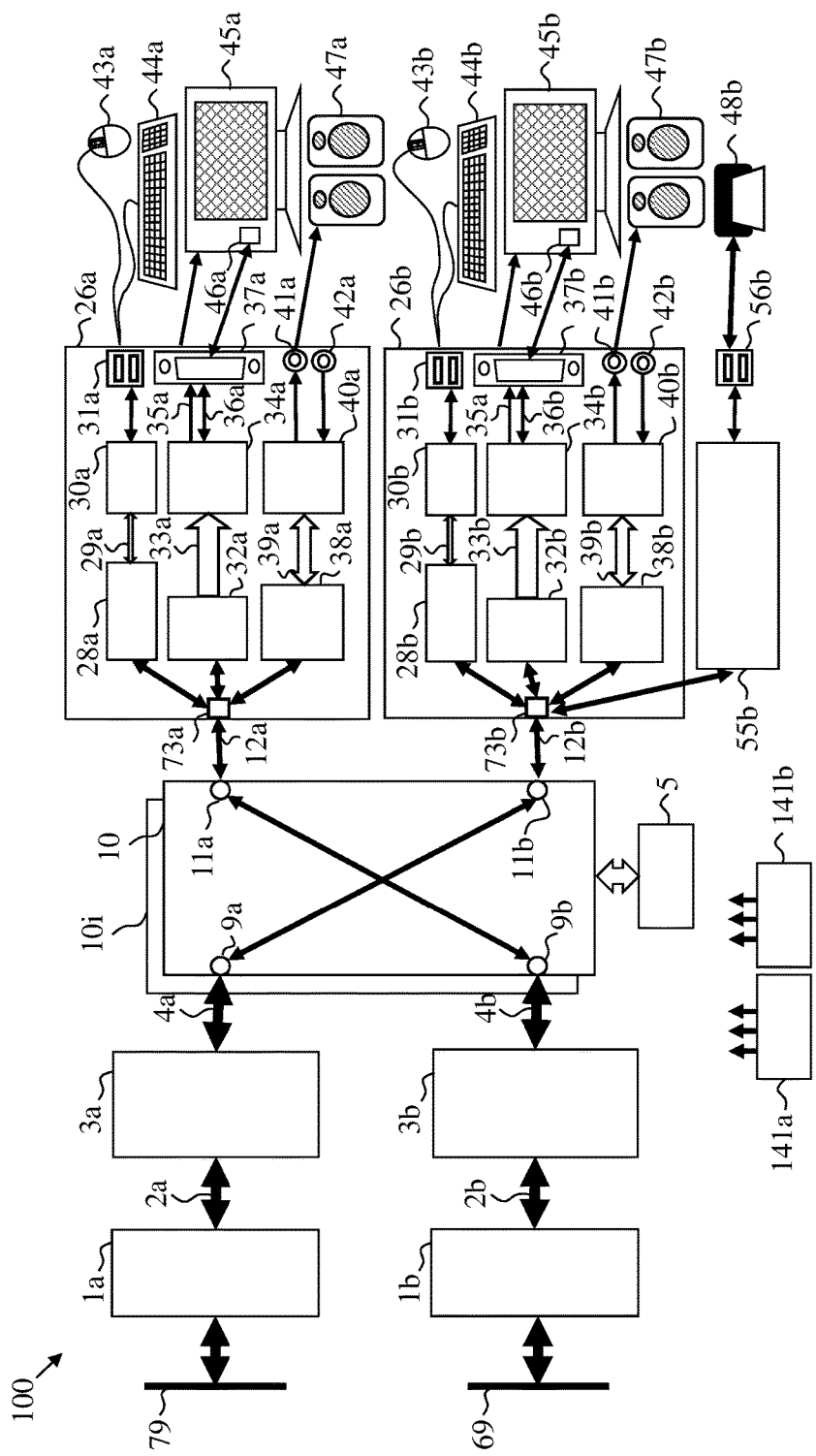
FIG. 3 illustrates the same KVM Matrix system 1 FIGS. 1 and 2 above with further detailed internal structure of the Matrix console.

FIG. 3 illustrates the block diagram of the same KVM Matrix system 100 of FIGS. 1 and 2 above with further detailed internal structure of the Matrix console adapter 26x.

The Matrix console adapter 26x interfaces between the high-speed serial data stream from output port 11x of matrix fabric function 10, and the user peripheral devices.

Matrix host console 26x is coupled to the matrix fabric function 10 output port 11x through serial cable 12x made of copper or fiber optical links. Serial cable 12x is connected to connector 73x that designed to interface with the serial cable 12x. Connector 73x may be CATx jack, SFP cage or any other high-speed serial interface connector or coupler. The internal channels inside the Matrix console adapter 26x are all coupled to the connector 73x directly or indirectly through a function that separate the different streams (for example an FPGA with high-speed transceivers).

Matrix console adapter 26x may be configured as a removable card within a modular rack or as a stand-alone appliance or module. It comprises a host emulator 28x including a processor such as an FPGA, ASIC or microcontroller that inserts USB HID commands into the serial data stream switched by the matrix fabric function 10. Host emulator 28x serves as a host emulator to enable interface with standard USB user peripheral devices. Host emulator 28x is coupled internally to the USB Physical layer function 30x through standard or proprietary interface 29x that use protocols such as ULPI. The USB Physical layer receives and transmits standard USB packets to communicate with connected HID peripheral devices through the USB HID ports 31x. These ports are used to connect the use's keyboard 44x and mouse 43x. The user mouse or other pointing device 43x and the user keyboard 44x are typically connected to USB HID port 31x through USB cables and standard USB Type-A plugs.

The Matrix console adapter 26x is further comprising of a video channel/s that supports one or more user displays 45x. Video conversion function 32x, comprising an FPGA, ASIC or microcontroller is used to convert the incoming serial data stream into standard video format such as HDMI, DVI, VGA or DisplayPort. This function typically also decodes (un-compresses) the incoming video data in order to support high resolution video at the matrix fabric available bandwidth.

The output of the Video conversion function 32x drives the one or more user displays 45x through the internal or external raw video interface 33x, the video transmitter function 34x and the video display port 37x. The video transmitter function 34x converts the incoming raw video stream (33x) into standard video protocol such as HDMI, DVI, VGA or DisplayPort. In some implementations the raw video interface 33x and the video transmitter 34x functions are embedded inside the video conversion function 32x. The video display port 37x is typically comprises of raw video output signals 35x and bi-directional video plug and play (EDID) link 36x to enable automatic detection of connected user display 45x by reading it's EDID EEPROM 46x.

The Matrix console adapter 26x may be further comprising of one or more optional analog audio channel/s that supports analog audio peripheral devices such as user speakers or headphones 47x or user microphone (not shown in this example).

Audio processor function 38x is used to compress incoming user microphone audio data stream and also to decompress audio out data stream transmitted from remote computer 1x. Audio digital bi-directional interface 39x is typically I²S protocol used to interface with standard audio codecs 40x. The Audio CODEC function 40x contains all audio analog front-end functions such as audio mixer, Analog to Digital and Digital to analog. The Audio CODEC function 40x is coupled to the analog audio output port 41x that enables connection of user speakers or headphones 47x and it is also coupled to the analog input port 42x. Analog input port 42x may be connected to a microphone or to line input source. Both audio ports 41x and 42x are typically standard 3.5 mm stereo jacks.

It should be noted here that certain digital video protocols used to drive user displays may also contain one or more digital audio output channels that may be routed by the matrix fabric function 10 together with the video.

KVM matrix system 100 may further support another general purpose (non-HID) USB device such as user authentication device 48x. Such device would need a dedicated bi-directional USB channel over the matrix fabric function 10. To enable such channel, General-Purpose USB Host emulator function 55x is used inside or outside to the Matrix console adapter 26x. An example for such host emulator function is the USB extender chipset from iCron called LionsGate™. USB Host emulator function 55x is emulating the computer in front of the connected peripheral and generate serialized data at the other end. It is coupled to the user USB device 48x through one or more USB port/s 56x.

For years such prior-art KVM matrix systems were used in critical high-security applications without any special security concerns. Nevertheless, over the last few years as network security risk management mandate high isolation between networks, it recently became apparent that such KVM matrix implementation may leak high-security data into low-security networks. KVM equipment thus became a major security risk as attackers learned how to abuse them in order to compromise high-security networks through remote external cyber-attack. The size and complexity of such prior-art systems created big challenges when any vendor attempted to evaluate them against modern security standards.

The next figure illustrates the physical structure of a typical KVM matrix known in the art.

FIG. 4 illustrates the typical physical layout of a KVM Matrix system 100 known in the art as shown schematically in FIGS. 1 to 3 above. System 100 may be installed in one or more modular metal enclosures that fits standard 19" racks.

Matrix fabric function 10x is implemented in this system as back-plane PCBAs having multiple hot-swap I/O (input output) removable cards 140x. Each I/O removable card 140x comprises of four matrix output ports 9x and four matrix input ports 11y in the form of CATx jack or SFP cage. In this system 100 there are sixteen I/O removable cards 140x and therefore there are sixty four matrix output ports 9x and sixty four matrix input ports 11y.

In this example the Matrix fabric function is modular—some high hierarchy parts are located in the backplane and others lower hierarchy parts are located in the different hot-swap I/O (input output) removable cards 140x.

It should be noted here that the distinction between input ports 9x and output ports 11y may be semantic as in most modern KVM matrix each port may be configure as both types. Also modern KVM Matrix may support broadcast—one input being routed into multiple outputs. This mode may be useful to enable distribution of the same video feed to multiple users through multiple displays. Similarly specific host computers (KVM Matrix host adapters) and consoles may be disabled if needed. Such function may be useful to support a pull of backup computers or to support additional users in case of emergency event.

System 100 is having two different racks each with dual redundant AC/DC power supplies 141x that powers the all modular components of that same rack. AC/DC power supplies 141x are powered from main AC power source and generate the required DC power planes to power all left side KVM matrix components. Similarly AC/DC power supplies 141y are powered from main AC power source and generate the required DC power planes to power all right side KVM matrix components. Additional lower/higher voltage power planes and power supply may be further installed in the Matrix fabric function 10x back-plane and in the I/O removable cards 140x. I/O removable card 140x may have handle or special ejectors to assist in removal and insertion of cards during operation (i.e. to enable hot swapping while the system 100 is powered and operational).

KVM Matrix system 100 rack may also have an independent Matrix controller function 5 installed as a removable card or module to manage the matrix fabric function 10x and to manage and monitor the various I/O removable cards 140x. Multiple Matrix controller functions 5x may be installed in the rack to support redundancy (high-availability).

I/O removable card 140x output port 9x is coupled though serial cable or fiber 12x to the Matrix console adapter 26x card. This is done with external cable or optical fiber (as opposed to internal backplane routing) to allow modularity and scalability. Also the left side rack and the right side rack are typically co-located. The majority of the serial links in the system are typically external to enable customization, hot-swapping and redundancy. There are many card variants that the customer can select to install. Removable cards may be mixed for different deployment configurations.

Matrix console adapter 26x card is further coupled to the user's desktop peripheral devices such as: the user mouse or other pointing device 43x and the user keyboard 44x through USB ports 31x. It is also coupled to one or more user display/s 45x through video display port 37x. It may also be coupled to the optional user speakers or headphones 47x, user microphone 125x that is coupled through microphone port 42x and the user authentication device or other USB device 48x coupled through General Purpose USB port 56x.

To reduce figure cluttering, only one serial cable or fiber 12x and one set of HID is seen in this figure. However multiple serial cables or fibers 12x and multiple sets of HIDs may be used. Similarly, to reduce figure cluttering, only one serial cable or fiber 4y and one computer 1y is seen in this figure. However multiple serial cables or fibers 4y and multiple computers 1y are generally in use.

Matrix console adapter 26x may be implemented as a single removable card that uses a single slot or as dual removable cards that uses two slots as shown in this figure.

I/O removable card 140x input port 11y is coupled though serial cable or fiber 4y to the Matrix host adapter 3y card high-speed connector 73y. Matrix host adapter 3y card is further coupled to connected computer 1x through cables.

Video cable 59y is connected between the computer 1y display port and Matrix host adapter 3y card display port 17y.

USB cable 58y is connected between the computer 1y USB port and Matrix host adapter 3y card HID USB Type-B interface port 13y.

USB cable 144y is connected between the computer 1y USB port and Matrix host adapter 3y card General-Purpose USB Type-B interface port 61y.

I/O removable card 140y audio output 21y and input 22y are coupled through audio cables 74y and 75y to the connected computer 1x audio input and output ports respectively.

It should be noted here that the modular structure of system allows organizations to customize the different resources based on their expected use or on the required redundancy to maximize the system up time. For example: the number of power supplies 141i may change to support various redundancy schemes. The number of I/O removable card 140i ports may be different than the number of Matrix host adapters 3i and Matrix console adapters 26i.

Next figures (FIGS. 5, 6A, 6B and 7) will demonstrate how KVM Matrix known in the art, may be abused to leak data between connected networks.

Figure 5:
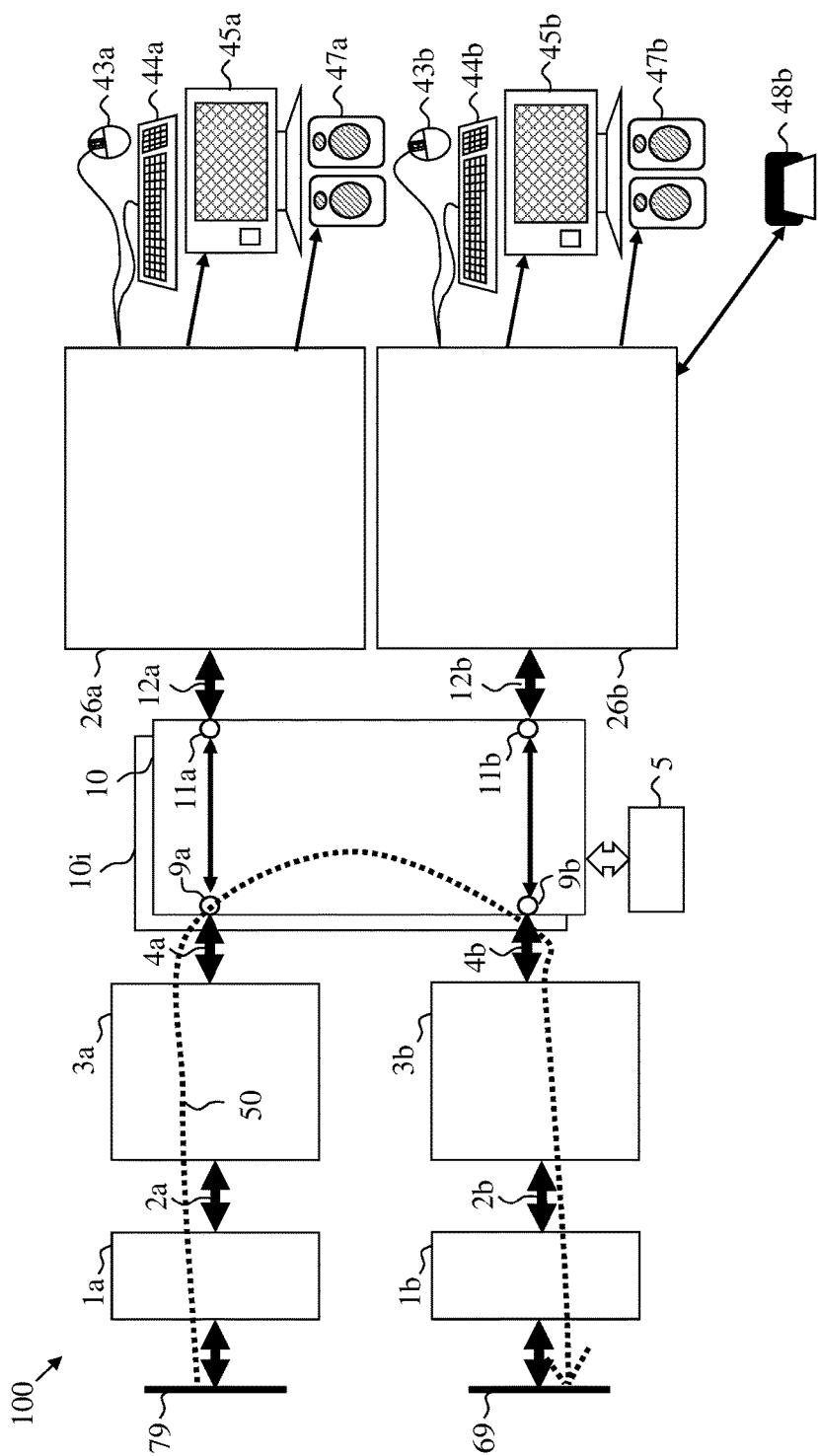
FIG. 5 illustrate a security vulnerability of a prior-art KVM Matrix system similar to the system illustrated in FIGS. 1 to 4 above.

FIG. 5 schematically illustrates a security vulnerability of a prior-art KVM Matrix system 100 similar to the system illustrated in FIGS. 1 to 4 above.

Before a deeper vulnerably analysis of KVM matrix is described, it is important to understand the value of such analysis and its relevancy to certain prior-art IT systems.

During the past few years criminals as well as well funded government organizations have learned to abuse certain IT elements that are not defined as security products to attack target organizations and to capture their secrets or assets. This method of abusing simple IT equipment for sophisticated orchestrated attacks recently repeated with surveillance cameras (US internet infrastructure 2016), KVMs (Barkly's Bank UK 2014) and frequent attacks on VoIP phone systems. This attack method revealed to the general public in 2013 when Edward Snowden leaked detailed technical information about the NSA daily abuse of IT products such as servers, mobile phones and many other IT products. As a result the Cybersecurity is constantly trying to:

Design new Cybersecurity products that will prevent such abuse or attacks; and

Redesign or reinforce existing IT products to mitigate such risk.

The current subject matter is taking the second concept to analyze the potential security vulnerabilities of existing KVM matrix products and to add a security layer that will mitigate the risks. The method used for this vulnerability analysis developed by the applicant specifically to cover this type of complex large scale KVM matrix systems. Similar method is presented in the referenced document "U.S. Government Approved Protection Profile—Protection Profile for Peripheral Sharing Switch Version 3.0". The following text and figures further extends the threats analysis and mitigation methodology used for single user KVM to multiple user KVM Matrix.

In this figure, first potential security risk is illustrated through the dotted line 50. Computer 1a in this example is connected to the high-security network 79. It is coupled through Matrix fabric function 10 to the first set of user peripheral devices 43a, 44a, 45a, and 47a. Computer 1b in this example is connected to low-security network (or the Internet) 69. It is coupled through matrix fabric function 10 to the second set of user peripheral devices 43b, 44b, 45b, and 47b.

Failure or deliberate attack on Matrix fabric function 10 or Matrix controller 5 may cause temporary or permanent leakage of high-security data from the high-security network 79, through computer 1a, through Matrix host adapter 3a, Serial data 4a, Input port 9a, Matrix fabric function 10, Input port 9b, Serial data stream 4b, Matrix host adapter 3b, Standard computer peripheral interfaces 2b, computer 1b to the low-security network 69. From computer 1b, high-security data may be leaking to a remote attacker through the low-security network 69 that may be connected WAN or internet. This unauthorized data flow (leakage) is shown as dotted line 50.

It should be noted that data leakage may occur in data protocols other than digital data. For example—leakage of audio signal from computer 1a to computer 1b may be abused to carry data through modulation (similar to fax or modem).

It should be noted here that data leakages may also take place through signaling attack—a situation when a single bit (0 or 1) may be transferred between the two computers at a time. After long time of signaling, it is possible to leak significant amount of critical data from computer 1a to computer 1b.

Leakage of high-security data to the internet is considered the most severe security breach scenario possible in many organizations.

Figure 6A:
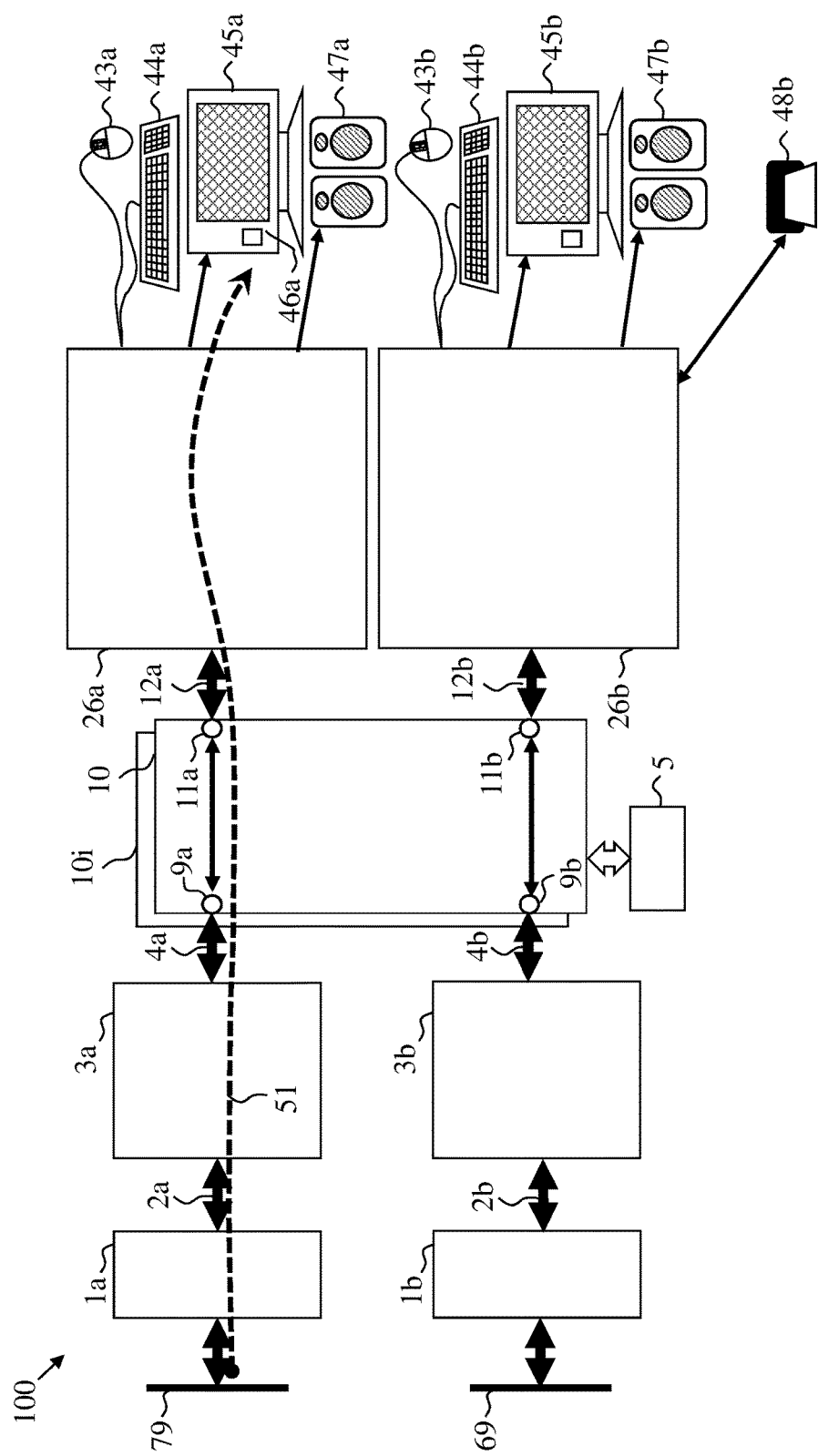
FIG. 6A illustrate another a security vulnerability of a prior-art KVM Matrix system similar to the system illustrated in FIGS. 1 to 4 above.

FIG. 6A schematically illustrate a a prior-art KVM Matrix system 100 similar to the system illustrated in FIGS. 1 to 5 above.

Figure 6B:
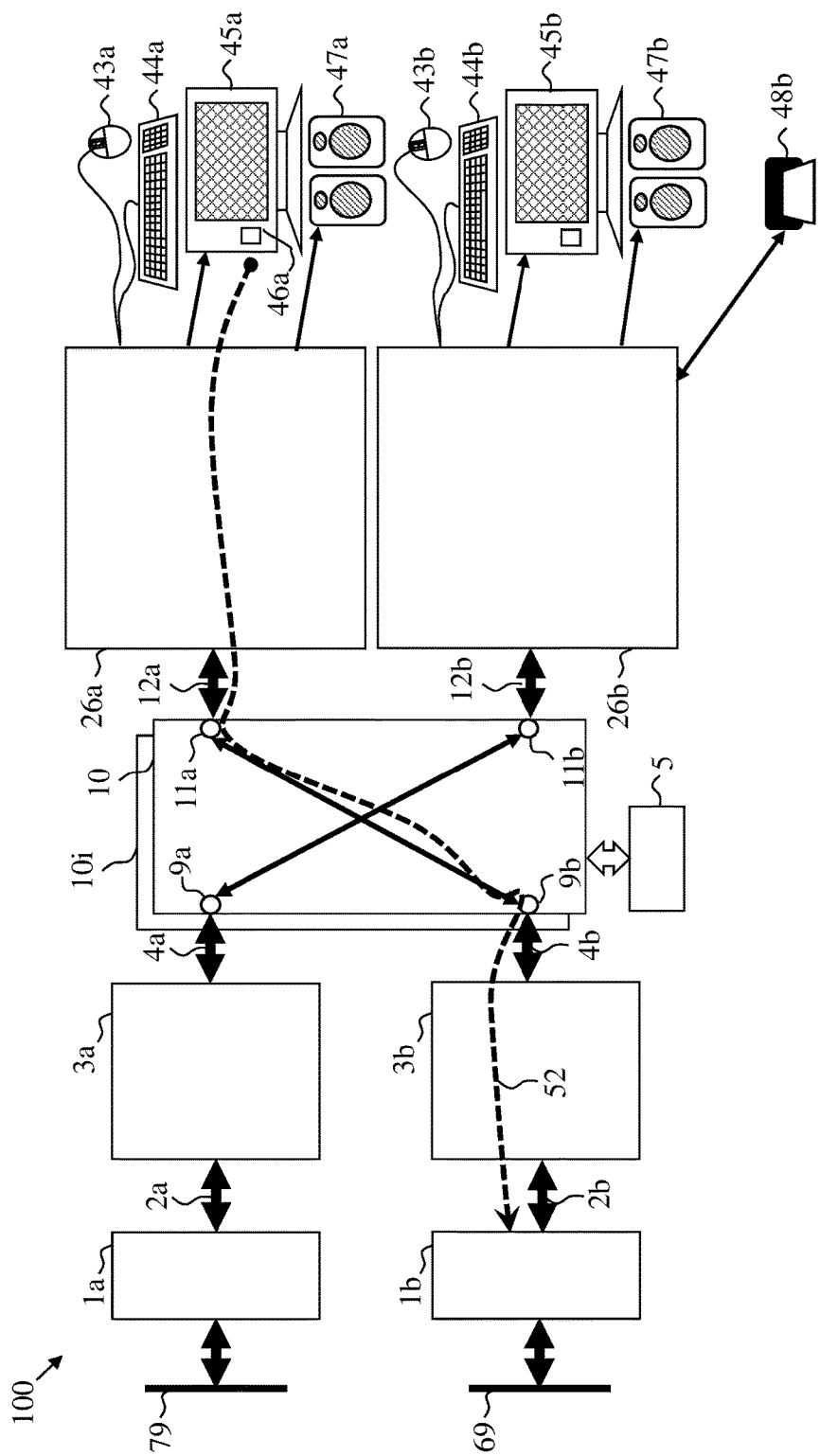
FIG. 6B illustrate another security vulnerability of the same prior-art KVM Matrix system of FIG. 6A when the matrix fabric function is switching the first display to the second (low-security) computer.

In this figure, second potential security risk is illustrated through the dotted line 51 in this figure, and the dotted line 52 in the next FIG. 6B.

It should be noted here that data may flow or leak through different types of carrier data: attacker may abuse the video channel bi-directional EDID to transfer data. Attacker may also abuse the HID channel, the bi-directional USB or even the analog audio channel for that same purpose.

Computer 1a in this example is connected to the high-security network 79. It is initially coupled through matrix fabric function 10 to the first set of user peripheral devices 43a, 44a, 45a, and 47a.

Computer 1b in this example is initially connected to low-security network (or internet) 69. Computer 1b is initially coupled through matrix fabric function 10 to the second set of user peripheral devices 43b, 44b, 45b, and 47b.

Known or unknown security vulnerability in one of the peripheral devices 43a, 44a, 45a, or 47a may allow temporary or permanent (non-volatile) storage of certain data. Such security vulnerability is called "mail-box memory". For example, high-security data may be written by computer 1a on the connected display 45a (for example within EDID 46a) while the matrix fabric function 10 couples display 45a to this computer.

Next FIG. 6B illustrates the situation when matrix fabric function 10 is switching the same display 45a to the second (low-security) computer 1b.

FIG. 6B schematically illustrates the same prior-art KVM Matrix system 100 of FIG. 6A when the matrix fabric function 10 is switching the first display 45a to the second (low-security) computer 1b.

At that time, the high-security data that was stored on display 45a mail box memory is accessed by computer 1b that in turn send that high-security data through the low-security network, to a remote attacker that is interested in that data.

Depending on the size of the stored data, over time this data leakage method may be exploited to enable high-security secrets to flow into the hands of a remote attacker.

Failure, deliberate attack, misconfiguration or even normal operation of matrix fabric function 10 or matrix controller 5 may cause temporary or permanent leakage of high-security data from computer 1*a*.

This attack has two stages:

First, (as seen in FIG. 6A), high-security data is transferred through Matrix host adapter 3*a*, Serial data stream cable 4*a*, Input port 9*a*, Matrix fabric function 10, input port 9*a*, Matrix console 26*a* to a mail-box memory in one of the user HIDs 34*a*, 44*a*, 45*a*, 47*a* or 48*a*.

It should be noted that seemingly simple devices such as a mouse or a keyboard includes a processing power, and thus are vulnerable to hacking. More sophisticated user devices (e.g. printers, scanners, cameras, etc.) often contain sizable local memory. Additionally, a fake or doctored HID device may be used (knowingly or unknowingly to the user). Such a device may be configured to behave as an efficient mail-box memory.

Second, when matrix fabric function 10 switches (as seen in FIG. 6B), the high-security data is transferred from the mail-box memory, via Matrix console 26*a* to output port 11*a*, trough matrix fabric function 10 to Input port 9*b*, Serial data stream cable 4*b*, Matrix host adapter 3*b*, Standard computer peripheral interfaces 2*b* to computer 1*b*.

From computer 1*b*, high-security data may be leaking to a remote attacker through the connected WAN or internet. This unauthorized data flow (leakage) is shown as dotted line 50.

The two stages may repeat many times.

Leakage of high-security data to the internet is considered as the most severe security breach scenario possible in many organizations.

Figure 7:
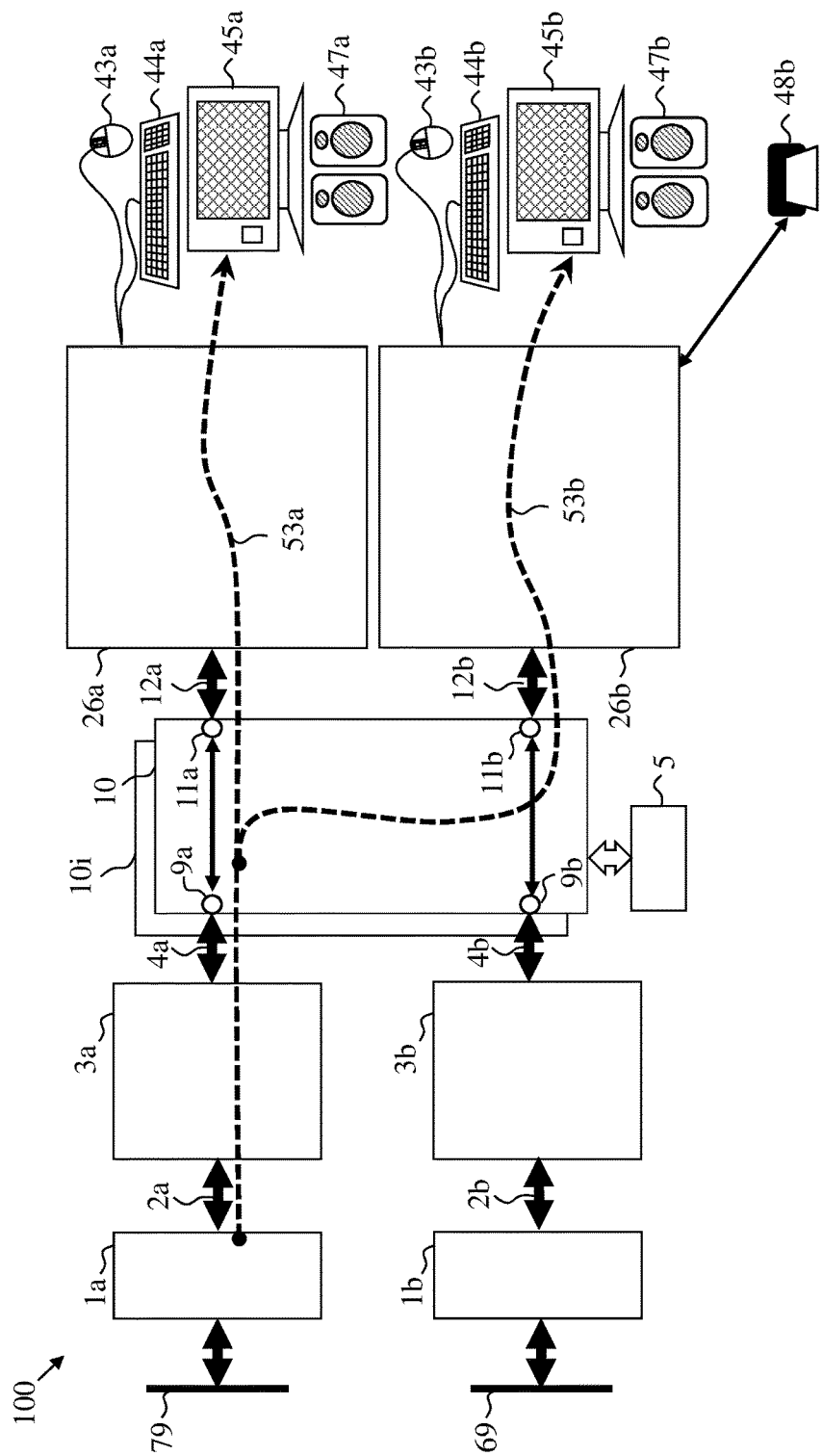
FIG. 7 illustrate the same prior-art KVM Matrix system of FIGS. 1 to 6B above while illustrating yet another potential security risk that evolves data leakage between user consoles.

FIG. 7 schematically illustrates the same prior-art KVM Matrix system 100 of FIGS. 1 to 5 above while illustrating another potential security risk that evolves data leakage between user consoles. It should be noted here that this particular risk is considered less severe compared to the other two risks shown in FIGS. 6A and 6B above for the following reasons:

1. In many organizations, the users are trusted and the entire system is deployed in high-security trusted zone (zone with restricted access to users that have same level of classified data access). For this reason leakage between trusted users is less probable in comparison to leakage to external attacker that is untrusted and hostile.
2. Users are typically allowed to shadow other users for operational or training reasons. Such function is required and allowed in many cases.
3. Specific user information is considered less critical security asset in comparison to the high-security network assets in general that may be accessed by the previous risk scenarios.
4. The attacker must be local (cannot attack remotely).

Generally, the high-security trusted zone is guarded and users are restricted from bringing in or taking out any data storage devices. Since a user can only remember limited amount of data, massive data leak is unlikely unless leak is created between networks of different security levels. Data leakage that leaks secret data to external (internet) network is the ultimate nightmare scenario. Such leakage may go unnoticed for long time. Automatic (even relatively slow) leak (due to the limited capacity of the mail box memory) may, over long time, can transfer massive amount of data.

In this figure, first user is coupled to first computer 1*a* that is connected to the high-security network 79 (represented by dotted line 53*a*), while the second user is connected to the low-security computer 1*b* that is coupled to the low-security network Assuming that second user does not have the required security permissions to view the first user session, in case of a failure or attack on the matrix fabric function 10 or matrix controller 5, such leakage (represented by dotted line 53*b*) may occur.

This leakage may allow second user to view data intended for first display 45*a* video on his/her second display 45*b*. This type of leakage may not be limited to viewing the other user screen. Second user may store, and transmit secret information from connected computer 1*a* to network 69. In fact, with hacked HID, this attack can happened without the participation of user b, or even without him knowing that his HID was replaced, hacked or doctored and is used for leaking information.

FIG. 8 schematically illustrates a block diagram of a security enhanced KVM Matrix system 110 according to an exemplary embodiment.

In this embodiment each port connecting the Matrix host adapter 3*x* to a computer 1*x*; and each port connecting the Matrix console adapter 26*x* to a user HID is protected by an Isolator 60*i*.

It should be noted that the input (computer side) security isolators and the output (console side) security isolators are very similar in construction and therefore are designated with the same number 60*i*. Nevertheless they may differ in firmware functionality, in the physical design (interfaces and connectors) and in their configuration, their software, or the configuration of their software. Same security isolator hardware may be used to reduce costs of security evaluation and testing.

Isolator 60*a* is placed between first Matrix console adapter 26*a* and first user peripheral devices 43*a*, 44*a*, 45*a* and 47*a*.

Isolator 60*b* is placed between second Matrix console adapter 26*b* and second user peripheral devices 43*b*, 44*b*, 45*b* and 47*b*.

Isolator 60*c* is placed between first computer 1*a* and first Matrix host adapter 3*a*.

Isolator 60*d* is placed between second computer 1*b* and second Matrix host adapter 3*b*.

For figure simplicity, only two computers and two user consoles are see, however the numbers are generally larger. Additionally, and optionally, number of users may not be the same as the number of users.

There are certain system and environmental assumption that must be highlighted before the security characteristics of this system can be described:

1. Untrusted area at the left side 70 contains the various computers 1*x* and their connected networks 79 and 69. We assume here that computers may be infected by a malicious code targeting the KVM Matrix or its connected peripherals in order to leak high-security data or in order to interfere with the system normal operation.
2. Low-security computers may be fully controlled by remote attackers.
3. Matrix host adapter 3*x*, Matrix fabric function 10, Matrix controller 5 and Matrix console adapter 26*x* are contained in central untrusted area 71. In this area, remote attacker action, failure or normal system behavior may bridge any input to any other input or output.
4. Peripheral devices are untrusted (contained in area marked as left untrusted area 72). They may contain multiple known or unknown security vulnerabilities such as data memory (mail boxes) or state memory.

In this FIG. 8, each one of the identical isolators 60*x* is having among other internal functions, unidirectional data diodes that physically enforce data to flow in one direction only as indicated by the diode symbols 64x, 65x, 66x and 67x.

Data diodes are placed on the different channels:

HID diodes 64x are placed on the HID (keyboard and mouse) channel to enforce data flow only from keyboard 44x and mouse 43x, to the routed computer 1x.

Similarly video diodes 65x are placed on the video raw data channel to enforce data flow only from the routed computer 1x to the user display 45x.

EDID diodes 66x are placed on the video EDID channel to enforce data flow only from the user display 45x to the routed computer 1x.

Audio diodes 67x are placed on the audio output channel to enforce data flow only from the routed computer 1x to the user speakers or headphones 47x.

The data diodes are used to mitigate some of the security risks shown in FIGS. 5, 6A, 6B and 7 above.

For example:

An attempt by computer 1a to write data into the user display 45a EDID EEPROM or microcontroller 46a will be blocked by data diodes 66c in isolator 60c and 66a in isolator 60a. With the presence of isolators at both ends, data would not reach the user display 45a. This exemplary embodiment will prevent the security risk illustrated in FIGS. 5a and 5b above.

Similarly, an attempt by computer 1a to write data into user keyboard 44a will be blocked by data diodes 64c in isolator 60c and 64a in isolator 60a. With the presence of isolators at both ends, data would not reach keyboard 44a or mouse 43a.

An attempt by computer 1a to transfer data between computer 1a audio output and computer 1b audio output will be blocked by data diodes 67d in isolator 60d. Such transfer of data may be implemented in the form of audio beeps similar to fax or modem. Computer 1b audio output may be abused by remote attacker to become an audio input that may receive such beeps and convert them back into digital data.

The inclusion of additional security functions in the isolators 60x shown in this figure will be shown in the next figures.

FIG. 9 schematically illustrates a block diagram of a simplified security isolator 600x placed at the output ports of enhanced KVM Matrix system according to an exemplary embodiment. This exemplary embodiment is having security isolator 600x that is similar to isolator 60x of FIG. 8 above but it is lacking the analog audio and General-Purpose USB channels shown in FIG. 8 above.

KVM Matrix isolator 600x of the exemplary embodiment is having two channels:
 HID Channel 90x to support the user keyboard and mouse; and
 Video channel 105x to support one user display.

It should be noted that similar exemplary embodiments may have multiple duplicates of video channel 105x in order to support users having multiple displays.

User USB keyboard 44x is connected to the isolator 600x HID Host Emulator function 85x through USB jack 89x and USB lines 87x.

User USB mouse 43x is connected to the isolator 600x same HID Host Emulator function 85x through USB jack 88x and USB lines 86x.

The HID Host Emulator function 85x is a microcontroller that runs the required firmware to emulate computer Host HID USB stack. It designed only to enumerate and support HID and no other USB device classes. The HID Host Emulator function 85x may further support HID white-list and black-list to enable further filtration of supported keyboard and mouse devices. It may be configured through special software application to enable pairing to a specific USB device serial number to prevent usage of malicious USB device that impersonate a standard USB keyboard. The HID Host Emulator function 85x may further support HID authentication to enable stronger pairing to special high-security keyboards and mice. High-security keyboards and mice (or other pre-qualified USB devices) are manufactured and delivered by trusted supplies under stringent security requirements that assure its authenticity. Such authentication may be used to assure that the only keyboards and mice used with the KVM Matrix are qualified and approved devices.

It receives keyboard and mouse inputs from the user keyboard 44x and mouse 43x and convert them into serial data transmitted uni-directionally on serial line 84x to uni-directional HID data diode 64x. Unidirectional data diode 64x enforces data to flow only from the keyboard 44x and mouse 43x to the routed computer 1x. Unidirectional serial data leaving data diode 64x through serial line 83x is entering the device emulator function 82x where all keyboard and mouse commands are being translated back to standard bidirectional USB keyboard and mouse commands. The device emulator function 82x emulating a standard USB HID composite device having at least one keyboard and one mouse devices. The device emulator function 82x is coupled through USB lines 81x to USB Type-B jack 80x that enable direct connection through standard USB cable 61x to the Matrix console adapter 26x.

It should be noted here that since some common KVM Matrix designs does not support a composite keyboard and mouse USB device, HID Channel 90x may be divided into two similar channels—one for the user keyboard 44x and the other for the user mouse 43x. The two separate device emulators are then coupled through two separate USB lines to the Matrix console adapter 26x separate keyboard and mouse USB ports.

This implementation of HID Channel 90x assures that data cannot flow back into the keyboard and mouse memory and it also assures that only qualified keyboard and mouse will be enumerated and supported by the system. The HID Host Emulator 85 designed to enumerate only legitimate keyboard and mouse. An attempt to connect a composite device having non-HID devices or hub having non-HID devices will be blocked by the HID Host Emulator 85. Even BadUSB device that may attempt to reset the USB link and re-enumerate as a different device will be blocked by the HID Host Emulator 85 as it will fail to re-enumerate as non-HID device.

User display 45x is coupled to the isolator 600x display output connector 94x with a cable. Depending on the video protocol supported by display 45x, the video signal routing will be different:

1. Simple video protocols (protocols having Display Data Channel (DDC) lines) such as VGA, DVI and HDMI do not require any form of format conversion in the isolator to secure it. If one or more of these protocols is to be supported by the video channel 105x then video interface may divided into raw video (upper arrow 77x) and EDID lines (lower arrow 76x).
2. Composite video protocols (protocols having link handshaking) such as DisplayPort requires internal conversion into simple video protocol. In this case both display output cable arrows are combined into 1-4 differential lanes.

In the case of simple video protocol, the following process is taking place:

a) Display 45x EDID read—Upon connection of a display 45x or after system powers up, video controller function 96x is coup led to the display EDID EEPROM 46x through lines 95x, video connector 94x and lines 76x, and the video controller function reads the display EDID EEPROM content. During the reading process, the video controller function 96x commands the two coupled switches 98x and 100x to position to the left (normal mode position) through video mode line 97x. This left position of switch 100x couples the emulated EDID EEPROM chip 101x to the video input port 91x through line 102x. The left position of switch 98x couples the emulated EDID EEPROM chip Write Protect line 99x to enable write protection. This switch 98x position prevents any possible data write attempts from routed computer 1x to the emulated EDID EEPROM chip 101x. The left position of switch 100x couples the emulated EDID EEPROM chip 101x data and clock lines through lines 102x, video input port 91x and video cable 62x to the video output of the Matrix console adapter 26x.

b) Display 45x EDID Check—Once video controller function 96x completed the display 45x EDID read, it checks that the content is legal and valid (complies with VESA standard (Video Electronics Standards Association), setting the standards used to attach PC to a monitor). Only then, it commands the two switches 100x and 98x to position to the right side (EDID write position) through video mode line 97x.

c) EDID Write to Emulated EDID EEPROM chip 101x—This right position of switch 100x couples the emulated EDID EEPROM chip 101x clock and data lines to the video controller function 96x. The right position of switch 98x couples the emulated EDID EEPROM chip 101x Write Protect line 99x to disable write protection. This switch 98x position enables the video controller function 96x to write back the EDID content that it previously read from display 45x into the Emulated EDID EEPROM chip 101x. Note that during this operation, the video input port 91x is disconnected, thus, information from other sources (e.g. from Matrix console adapter 26x, the matrix fabric or hosts) cannot interfere or inject foreign data to the Emulated EDID EEPROM chip 101x.

d) Back to Normal Mode—After the video controller 96x verifies that the EDID content was properly programmed into the Emulated EDID EEPROM chip 101x, it changes the video mode line 97x to position the two switches 98x and 100x back to normal mode (left position). This position allows the Matrix console adapter 26x to read the updated EDID content written on the emulated EDID EEPROM chip 101x. Depending on the video protocol supported, the video controller function 96x may signal through Hot Plug Detect line in video input port 91x that the EDID content is updated and ready to read. Note that during this operation mode, the Emulated EDID EEPROM chip 101x is write protected.

It should be noted that the process and method of operation in steps a) to d) above provides the following security advantages:

At no time would the EDID EEPROM 46x in the display 45x comes in direct contact with any component outside the security isolator 600x.

Emulated EDID EEPROM chip 101x can only accept verified information from EDID EEPROM 46x in the display 45x.

Thus, the EDID EEPROM 46x and the Emulated EDID EEPROM chip 101x cannot be exploited as mail-box memories.

The raw video output is driven from the Matrix console adapter 26x through video cable 62x, video input connector 91x, video line 92x, video raw data diode 65x, video line 93x, and display output connector 94x. The raw video output is coupled to the display 45x through video cable (77x and 76x).

Video raw data diode 65x is an electronic circuitry that assures that the raw video data will only flow from the Matrix console adapter 26x to the display 45x and not in the opposite way. This direction enforcing may be done through video repeater, transmitters, amplifiers or other components having high-speed unidirectional signal flow characteristics.

In the case of composite video protocol, the process is very similar to the one described above. Security isolator 600x may be designed or configured to support:

Only simple video protocol (for example DVI or HDMI);
Only composite video protocol (for example DisplayPort protocol); or
Both protocols using multiple video circuitries or video signal conversion.

The video channel implementation of the composite video differs from the video channel of a simple video protocol by the following differences:

Composite video signals from the Matrix console adapter 26x is passed through composite to simple protocol converter 78x (for example standard DisplayPort to HDMI converter chip). The raw video output of this first converter 78x is passed through the optional video raw data diode 65x. In this case the video raw data diode 65x may not be needed if first converter 78x is irreversible by design. The EDID lines of the first converter 78x are coupled through lines 102x to the same switch 100x described above.

Similarly, the output of the optional video raw data diode 65x is coupled through lines 93x to the second video format converter 79x. Second format converter converts simple video protocol back to composite protocol (for example HDMI to DisplayPort chip). The EDID lines of the second converter 79x are coupled through lines 95x to the video controller 96x. This enables the video controller function 96x to read the EDID content of the connected display 45x although the data is passed through video lanes (for example AUX lanes of DisplayPort protocol).

This double-conversion process enables the system to function similar to the steps detailed above. It should be noted here that additional signals such as Audio and HDCP (High-bandwidth Digital Content Protection) may be passed by the conversion or may be blocked depending on the desired system security level.

The video channel implementation described above effectively prevents any attempt to write data to the connected display 45a. Blocked data includes attempts to write EDID, to program the display firmware or to write or read MCCS (display Monitor Control Command Set) information. It serves as unidirectional data diode for the EDID contents as shown in FIG. 8 above—diodes 66x.

The video channel 66x of the security isolator 600x may or may not pass audio channels embedded in the video based on the specific security requirements. In case that embedded audio channels are supported, these channels are passed through lines 95x, optional video raw data diode 65x, and video lines 93x.

It should be noted here that the connectors and cables described in the text and shown in this and in the next figures may not be necessary if the isolator functions 60x 600x, 601x etc. is formed as a modular line-card that plugs into the matrix rack. In such case internal piggy-back connectors, flex cables or short cable harnesses may serve as interconnect links between the various components (replacing for example cables 61x, 62x and 2x). Isolator may also be connected directly into the KVM matrix backplane or PCBA (Printed Circuit Board Assembly).

FIG. 10 schematically illustrates same a block diagram of a simplified security isolator 600x shown in FIG. 9 above, as it is placed at the input ports of enhanced KVM Matrix system according to an exemplary embodiment.

The security isolator 600x is identical to the one shown in FIG. 9 above. Its method of operation (including reading and writing EDID information) is similar to the method detailed for FIG. 9 above.

In the input side of the system, the security isolator 600x is coupled to the routed computer 1x through similar USB HID cable 61x and video cable 62x.

The security isolator 600x is further coupled to the Matrix host adapter 3x through the USB mouse cable 58x, the USB keyboard cable 57x, the display raw video interface 54x and the display EDID lines 49x.

FIG. 11 schematically illustrates a block diagram of a security isolator 610x, placed at the output ports of another enhanced KVM Matrix system 180 according to an exemplary embodiment.

This exemplary embodiment is similar to the embodiment shown in FIGS. 9-10 above but it is further support General Purpose (GP) USB channel 190x and Analog audio channel 121x.

It should be noted here that the inclusion of a GP USB channel in complex secure environment such as KVM Matrix may cause additional security vulnerabilities as it requires high-speed bidirectional link. Still this GP USB function may be required to support critical security functions such as user authentication devices and biometric sensors.

The GP USB channel 190x is designed to enable connection of USB devices other than keyboard and mouse (that supported by the HID channel 90x). USB devices supported by the USB channel 190x may be defined through software to accept (whitelist) or to reject (blacklist) specific or groups of USB devices. USB devices supported by the USB channel 190x may be further defined through software to enable pairing to a specific USB device serial number to prevent usage of malicious USB device that behaves as standard USB keyboard.

Examples for such USB devices are: user authentication devices, cameras, scanners, and mass-storage devices. The GP USB channel 190x may be designed to support low-speed, high-speed, full-speed, super-speed (USB 3.0) or any other similar peripheral standard as required for the user.

User device 48x (smart-card reader in this example shown in FIG. 11), is connected to the device USB port 118x. This port is typically USB Type-A jack. The device USB port 118x is coupled through USB lines 117x to the GP USB Host Emulator function 116x. This GP USB Host Emulator function 116x may be implemented on a microcontroller, ASIC or FPGA to run the required host USB stack for the supported devices 48x. It emulates the computer host for the supported devices 48x. Coupled non-volatile memory 115x is used to store the local USB devices policy. This policy may include the following details:

a) White-list of allowed USB devices (as characterized by: USB Class, subclass, protocol, Vendor ID, Product ID, Serial Number etc.);
b) Black-list of not-allowed USB devices (as characterized by: USB Class, subclass, protocol, Vendor ID, Product ID, Serial Number etc.);
c) Log of connected devices;
d) Behavior after device-caused link reset; and
e) Direction of allowed file copy (from device, to device, bi-directionally).

The non-volatile memory 115x may be securely programmed by few methods such as:
1. Initial programming during production;
2. Coupling a computer using special USB Type-A to USB Type-A cable to keyboard console port 89x or mouse console port 88x. Special connection utility should run at the connected computer. After proper authentication, administrator may enter required operation; and
3. Through the management microcontroller 150x as will be described below.

The GP USB Host Emulator function 116x uses the data stored at the non-volatile memory 115x to decide if a connected device 48x is allowed or not. If not allowed, then it would only enumerate the device and then disable it. If allowed then it will enumerate it and after that communicate over the high-speed link 114x with the GP USB device emulator function 113x to prepare it for identical enumeration by the coupled USB host in the Matrix console adapter 26x. GP USB device emulator function 113x is coupled to the Matrix console adapter 26x through USB line 112x, USB host jack 111x and USB cable 68x. GP USB device emulator function 113x emulate the exact same enumeration parameters and end-points as captured by the coupled GP USB Host Emulator function 116x from the connected USB device 48x. Once GP USB device emulator function 113x was enumerated by the Matrix console adapter 26x, it will start repeating all received and transmitted traffic to and from the connected device 48x. Throughout the USB link operation time, the GP USB Host Emulator function 116x monitors the device 48x and the host computer 1x behaviors to block any unauthorized processes as defined by the local policy stored on the coupled non-volatile memory 115x. For example a request by the device to re-enumerate may be blocked. Another example is copy of data from device 48x to the routed host computer 1x.

GP USB device emulator function 113x is coupled through a bi-directional serial link 120x to the audio channel 121x audio CODEC function 122x. Connecting link may be proprietary or standard serial link such as I²S (Inter-IC Sound). Audio CODEC function 122x is integrating all analog to digital and digital to analog circuitry needed to encode and decode audio signals. Analog audio output is coupled through audio output port 124x to the connected headphones or speakers 47x. Analog audio input is coupled through audio input port 123x to the connected microphone 125x.

The GP USB device emulator function 113x further emulating a standard USB Audio CODEC to enable interaction with the routed computer 1x through USB channel or through another analog audio CODEC function located at the routed input isolator 610x as shown in next FIG. 12 below.

It should be noted here that in some high security designs it is preferred that the microphone channel would be removed to prevent potential eavesdropping. In that case the removal of receiving serial data line (SDIN) from interface

120x (bi-directional serial link 120) enables the system to act as unidirectional data diode as illustrated in FIG. 8 diodes 67x.

In other designs of the exemplary embodiment, it is possible that the USB HID serial data coming out of the data diode 64x will be routed to the GP USB device emulator function 113x through data line marked as unidirectional dashed line 130x. Such connection allows single USB interface with the Matrix console adapter 26x to enable data encryption for added security. In this implementation the HID device emulator function 82x, the HID host connector 80x and the USB cable 61x are not required and may be removed. Since many KVM Matrix systems are using certain keyboard combinations to send special commands to the Matrix controller function, HID device emulator 82x may be further programmed to:
1. Block all stand keyboard typing commands; and
2. To pass all special keyboard combination required to perform KVM Matrix commands.

This enhancement allows the KVM Matrix to receive unencrypted commands while all other keyboard inputs still encrypted for security.

Security isolator may further comprise of an optional security isolator management microcontroller 150x. Security isolator management microcontroller 150x is coupled through:
Bi-directional lines 151x to the HID Channel 90x host emulator 85x;
Bi-directional lines 152x to the Video Channel 105x video controller function 96x;
Bi-directional lines 153x to the GP USB Channel 190x Host emulator 116x and Device emulator 113x;

Security isolator management microcontroller 150x may store security related events (Log) in non-volatile memory (not seen in the figure for reducing figure clutter) to enable auditable traces in case of cyber-attack.

Security isolator management microcontroller 150x may also be coupled to a management LAN interface jack 154x to enable connection of remote computer or server that may be used to:
1. Configure and manage the security isolator 610x;
2. Download security isolator 610x log;
3. Generate warnings and events;
4. Enable manual loading of cryptographic keys; and
5. Enable GP USB channel whitelist, blacklist and detection functions (for more details see 15 below).

Management LAN interface jack 154x is coupled through LAN cable 149x to the Console side management LAN switch 148x that is also coupled to the console side management computer or server (not shown here).

FIG. 12 schematically illustrates a block diagram of a security isolator 610y, placed at the input ports of another enhanced KVM Matrix system 180 according to an exemplary embodiment.

This exemplary embodiment is similar to the embodiment shown in FIGS. 9-10 above but it is further support General Purpose USB channel 190y and Audio channel 121y.

The security isolator shown in this FIG. 610y is identical or similar to the isolator 610x shown in FIG. 11 above but it may have different connectors and may have slightly different firmware configuration. Its method of operation is similar to the method detailed for FIG. 11 above.

In the input side, the security isolator 610y is coupled to computer 1y through USB HID cable 61y (optional if linked marked as dashed line 130x is not implemented), video cable 62y and General Purpose USB cable 68x.

Audio in and out may be supported by the KVM matrix in 3 different ways:
1. Audio embedded in the video may be passed alongside with the video;
2. Analog audio may be passed through the system (less desirable from security standpoint as analog signals are more vulnerable for various analog leakages); and
3. Emulated USB Audio Codec method that extends the USB link of a remote USB audio CODEC.

In the case that analog audio inputs and outputs of computer 1y are being used with USB Audio CODEC 122y (Option #3 above) then audio cable 131y connects the computer 1y audio output signal through audio input port connector 123y to the USB audio CODEC function 122y. Similarly, audio cable 132y connects the computer 1x audio input signal through audio output port connector 124y to the USB Audio CODEC function 122y.

It should be noted that one reason for using USB audio CODEC function 122y is that CODEC within host 1x may not be trusted. If hacked, it may be used to attempt to transmit (and/or receive) data and codes other than legitimate audio signals. The trusted USB audio CODEC function 122y may be used to filter such unsafe signals. Similar function is performed by USB audio CODEC function 122x seen in FIG. 11.

For figure clarity, audio input port connector 123y and audio input port connector 123y were drawn on the left facing computer 1y.

The security isolator 610y is further coupled to the Matrix host adapter 3y through the optional USB mouse cable 58y, the optional USB keyboard cable 57y, the display raw video interface 54y and the display EDID lines 49y. General Purpose USB is coupled to the Matrix host adapter 3y through the additional USB cable 192.

It should be noted that in order to reduce security risks, the GP USB channel may be encrypted by the security isolators 610y as shown in more details in the next FIG. 13.

It should be noted that the number of USB connectors on matrix host adapter 3y and Matrix console adapters 26y should match or larger the number USB cables used.

Management LAN interface jack 154y is coupled through LAN cable 149y to the Host side management LAN switch 148y that is also coupled to the Host side management computer or server (not shown here).

Trusted security and system manager(s) can monitor and control the operation of the security isolators 610x and 610y. Optionally, an automatic monitoring software within the management computer or server is used for continues monitoring of security isolators 610x and 610y. Such automatic monitoring software within the management computer or server may issue an alert if abnormal activity is detected. Optionally, the filter activity may be suspended or stopped if abnormal activity is detected. Optionally, the activity of suspected section (such as a specific host or hosts), or the entire system may be suspended or stopped if abnormal activity is detected. For example communication to suspected section (such as a specific host or hosts, or specific user or users) may be terminated and blocked if abnormal activity is detected.

FIG. 13 schematically illustrates a block diagram of the security enhanced KVM Matrix system 180 shown in FIGS. 11 and 12 above according to an exemplary embodiment, with further details about the GP USB channel encryption.

In this embodiment the GP USB channel uses data encryption and mutual authentication to further add another layer of security to the KVM Matrix.

Security isolator 610*a* and its routed security isolator 610*c* are jointly authenticated using standard authentication protocol such as RSA 2048 and encrypt all USB traffic using standard crypto algorithm such as AES 128, AES 256 or ECC (Elliptic curve cryptography) or ECDH (Elliptic curve Diffie-Hellman).

Authentication and encryption/decryption services may be done by the isolators 610*x* GP USB device emulator function 113*x* or by separate component that is coupled to that function. The result is a secure tunnel 134*x* that pass all keyboard, mouse, audio and GP USB traffic (arrow 135*x*) in an encrypted form.

As encryption keys must change when Matrix fabric function 10*x* routes the user console to other coupled computers 1*x*, new keys must be generated (or key may be replaced) to enable new pairing. Such key generation and exchange may be done by servers or computers on the two management networks (the host management LAN and the console management LAN). In some embodiments, "Public-key cryptography" technologies may be used.

The following depicts an exemplary embodiment. Some of the mentioned components are marked in previous figures.

GP USB device emulator function microcontroller 113*x* receives 3 different unencrypted data streams:
1. Unidirectional or if security policy allows bidirectional HID serial traffic through line 130*x* from HID host emulator 85*x*;
2. GP USB packets sent from connected USB device 48*x* through GP USB Host emulator 116*x*; and
3. Audio packets received from USB Audio CODEC 122*x*. These packets contains the digitized data generating from the user microphone 125*x* input audio.

Using time-sharing or any other digital data combining protocol, these 3 sources are combined into a single data stream. Random padding may be used to fill out the channel and to avoid potential hacking through minimal data generated by users typing (such data may become weak data that can be easily used to break the encryption).

Using the selected encryption method, the combined data is being encrypted and transmitted through USB output 12*x* standard USB packets to the routed security isolator 610*x* (or y for clarity) other side of the system through the matrix fabric 10. This is done in order to maintain compatibility with the existing (prior-art) systems. The encrypted data uses USB frames. This optional implementation allows using the same channel that is currently there for non-encrypted USB traffic.

The Use of standard USB packets at output 12*x* allows existing (prior-art) KVM matrix to support such security enhancement without changing software or hardware.

Referring to FIG. 12 above—in the routed security isolator 610*y*, the process is reversed by:
1. Receiving data stream as USB packets by GP USB Host emulator 116*y*.
2. Decrypting the incoming data stream;
3. Stripping the incoming clear-text stream from padding; and
4. Separating the stream back to the 3 sub-streams (i.e. GP USB, HID and Audio).

The GP USB stream is coupled to the GP USB device emulator 113*y* that emulate the user GP USB device 48*y* in front of the connected computer 1*y* through USB cable 68*x*.

The HID USB stream is coupled through line 130*x* through the HID data diode 64*x* output, to the HID device emulator 82*y*. The HID device emulator 82*y* receives the serial data stream and converts it into standard USB keyboard and mouse USB commands in front of the connected computer 1*y*.

The audio stream is coupled through lines 120*y* to the audio CODEC 122*y*. This CIDEC may be coupled to computer 1*y* through analog audio jacks 123*y* and 124*y* and audio cables 131*y* and 132*y* respectively.

Alternatively the received audio stream may be used by the GP USB Device emulator to implement USB Audio CODEC device. Such device may co-exist with the GP USB device as composite USB device and connected to the computer 1*y* through a single USB cable 68*y*.

Similar process of data combining, encryption, USB packetization is happening at the opposite direction to enable secure data transfer from computer 1*y* to the user peripherals.

It should be noted that it is also possible to encrypt the raw video channel but this is typically not essential for security as raw video is unidirectional by definition. Such encryption may also add undesired latency to the video stream.

FIG. 14 illustrates the typical physical layout of a security enhanced KVM Matrix system 2000 of the subject matter as shown schematically in FIGS. 8 to 13 above.

The security isolators 610*x* in this embodiment are similar to the security isolators 60*x* shown in FIGS. 11 and 12 with different connector configuration to support KVM Matrix removable card form-factor with board-to-board connector to the modified KVM Matrix cards. Note that the board to board connector is not shown here as it is located between the security isolator card 610*x* and the coupled Matrix console adapter 260*x* cards. It is also located between the security isolator card 610*y* and the coupled Matrix host adapter 230*y* cards.

To reduce figure cluttering, only one serial cable or fiber 12*x* and one set of HID is seen in this figure. However multiple serial cables or fibers 12*x* and multiple sets of HIDs may be used. Similarly, to reduce figure cluttering, only one serial cable or fiber 4*y* and one computer 1*y* is seen in this figure. However multiple serial cables or fibers 4*y* and multiple computers 1*y* are generally in use.

It also should be noted that system 2000 may be scaled up by adding additional racks to accommodate additional components. For example, racks with security isolator card 610*y* and coupled Matrix host adapter 230*y* cards may be added to match the number of matrix input ports 11*y*.

The KVM Matrix 2000 Matrix console adapter 260*x* cards are similar to the Matrix console adapter 26*x* of FIG. 11 above with different panel and interconnect configuration (console display output, audio, keyboard and mouse removed from card front panel to the board-to board connector).

The KVM Matrix 2000 Matrix host adapter 230*y* cards are similar to the Matrix console adapter 26*x* of FIG. 12 above with different panel and interconnect configuration (console display input, audio, and HID USB removed from card front panel to the board-to board connector).

Matrix fabric function 10*x* is implemented in this system as back-plane PCBAs having multiple hot-swap I/O (input output) removable cards 140*x*. Each I/O removable card 140*x* comprises of four matrix output ports 9*x* and four matrix input ports 11*y* in the form of CATx jack or SFP cage. In this system 2000 there are sixteen I/O removable cards 140*x* and therefore there are sixty four matrix output ports 9*x* and sixty four matrix input ports 11*y*.

Same rack is having dual redundant AC/DC power supplies 141*x* that powers the whole rack. AC/DC power supplies 141*x* are powered from main AC power source and generate the required DC power planes to power all KVM matrix components. Additional lower/higher voltage power planes and power supply may be further installed in the Matrix fabric function 10x back-plane and in the I/O removable cards 140x. I/O removable card 140x may have handle or special ejectors to assist in removal and insertion of cards during operation (i.e. to enable hot swapping while the system 2000 is powered and operational).

KVM Matrix system 2000 rack may also have an independent Matrix controller function 5x installed as a pluggable card or module to manage the matrix fabric function 10x and to manage and monitor the various I/O removable cards 140x. Multiple Matrix controller functions 5x may be installed in the rack to support redundancy (high-availability).

I/O removable card 140x output port 9x is coupled though serial cable or fiber 12x to the Matrix console adapter 260x card high-speed serial connector 145x. In this example of the exemplary embodiment output security isolators 610x are implemented as modular removable cards that inserted in parallel and to the right side of each Matrix console adapter card 260x.

This arrangement allows the output security isolator 610x to have the following interfaces:
1. Power delivered from the redundant AC/DC power supplies through back-plane connector (not shown in this figure). Same standard connector that powers the Matrix console adapter 260x card;
2. Security isolator 610x HID serial interface line 130x (shown in FIG. 11 above) connected through internal module-to-module connector to the nearby Matrix console adapter 260x;
3. User keyboard 44x and mouse 43x are coupled to the security isolator 610x keyboard and mouse jacks 89x and 88x respectively;
4. GP USB and audio channel USB line 68x (shown in FIG. 11 above) is coupled through internal module-to-module connector to the nearby Matrix console adapter 260x;
5. GP USB device USB jack 118x is coupled to the user's GP USB device 48x;
6. Display input lines 62x (shown in FIG. 11 above) is coupled through internal module-to-module connector to the nearby Matrix console adapter 260x;
7. Display output connector 94x is coupled through display cable to the user display 45x.

Similarly, I/O removable card 140y input port 11y is coupled though serial cable or fiber 4y to the Matrix host adapter 230y card. In this example of the exemplary embodiment input security isolators 610y are implemented as modular removable cards that inserted in parallel and to the right side of each Matrix host adapter card 230y.

This arrangement allows the input security isolator 610y to have the following interfaces:
1. Power to the input security isolator 610y is delivered from the redundant AC/DC power supplies through back-plane connector (shown in FIG. 12 above). Same standard connector that powers the Matrix host adapter 230y card;
2. Security isolator 610y HID serial interface line 130y (shown in FIG. 12 above) connected to the coupled Matrix host adapter card 230y through internal module-to-module connector;
3. Security isolator 610y video channel input is coupled through lines 54y and 49y and through the internal module-to-module connector to the Matrix host adapter 230y card video input;
4. Computer 1y HID USB is coupled through USB cable 61y and HID USB jack 80y.
5. Computer 1y GP USB and audio channel USB are coupled through USB cable 144y and USB jack 61y;
6. Computer 1y display output is coupled through video cable 62y and video input connector 17y;
7. Computer 1y analog audio output is optionally coupled through audio cable 74y and analog audio input connector 21y;
8. Computer 1y analog audio input is optionally coupled through audio cable 75y and analog audio input connector 22y;

Matrix host adapter 230y and security isolator card 610x may be implemented as two cards as shown in this figure, or combined into a single removable card that occupies a single slot to enable higher densities.

FIG. 15 schematically Illustrates the configuration utility screen 800 used define the USB devices 48x allowed by the secure isolator GP USB host emulator 116x in accordance to an exemplary embodiment.

This screen 800 is presented on the connected administrator PC to enable configuration programming and monitoring of the security isolator GP USB channel. For example this screen 800 may appear in PC connected to the security isolator 610x optional management LAN interface jack 154x.

Screen 800 is divided into 3 main areas:
Area 220a is the Device White-list area. The entries in lines in this area indicating the devices that are allowed (qualified) by the secure isolator GP USB host emulator.
Area 220b is the Device Black-list area. The entries in lines in this area indicating the devices that are not allowed (will be rejected) by the secure isolator GP USB host emulator.
Area 220c is the Device Read area. The entries in lines in this area are showing the captured parameters of the currently connected USB peripheral device 48x.

To access screen 800, the user connects the management computer to the optional management LAN interface jack 154x and activates the security isolator management application. The administrator would need a specific password to interact with a security isolator. Once password is authenticated the current device policy will appear in this screen.

The administrator may then enter a new lines or drag and drop lines between the three areas—white-list, black-list and device read.

When entering a new line, the user/administrator may specify the following parameters:
1. Column 203 is the USB Class ID. The user/administrator may enter this field to allow/reject specific class of USB peripheral devices.

For example: class 0Bh is Smart card user authentication device. If a value 0Bh is entered in the white-list, it will cause qualification of all USB devices having class 0Bh.
2. Column 204 is the USB Sub-Class ID. The user/administrator may enter this field to allow/reject specific sub-class of USB peripheral devices.

For example: sub class 02h, If the value 02h is entered in the black-list will cause rejection of all USB devices having the designated class indicated in the corresponding Column 203 and sub-class 02h.
3. Column 205 is the USB Protocol. The user/administrator may enter this field to allow/reject specific protocol of USB peripheral devices.

For example: protocol 01h, If the value 01h is entered in the white-list will cause qualification of all USB devices having the designated class indicated in the corresponding Column 203 and sub-class indicated in the corresponding Column 204 and using communication protocol 01h.

4. Column 206 is the USB Vendor ID (VID). The user/administrator may enter this field to allow/reject specific VID of USB peripheral devices.

5. Column 207 is the USB Product ID (PID). The user/administrator may enter this field to allow/reject specific PID of USB peripheral devices.

6. Column 208 is the USB unique serial number. (SN) The user/administrator may enter this field to allow/reject specific serial numbers or serial number ranges of USB peripheral devices.

7. Column 209 is the Map to field. The administrator may enter in this field a + or − sign to indicate if that device can be mapped to the specific designated routed computer 1x. From left to right the signs indicating mapping to routed computers 1a to 1d.

8. Column 210 is the Direction field (available only for devices that support multiple computers and directional flow). The administrator may enter in this field:

a. N for none (no communication of the corresponding routed computer 1x to the specified device, this may be equivalent to inserting "-" in the corresponding location in 209 column, so as not to map the device to the corresponding computer);

b. R for read only (corresponding routed computer 1x may only read from the specified device);

c. W for write only (corresponding routed computer 1x may only write to the specified USB device 48x);

d. RW for both read and write.

Note that in each textual input field "*" may be entered to indicate wild-card.

Screen 800 may be used for creating, displaying, or modifying the parameters in an authorization matrix associating authorized devices to hosts and to directions of data FIG. 16 schematically illustrates a block diagram of a single secure Matrix console adapter 2601x, combining the functions of Matrix console adapter 26x and security isolator 610x, according to another exemplary embodiment.

The advantage having the security isolator 610x on a separate removable card or unit is reduction of design testing and verification costs, and the added flexibility of using existing infrastructure and adding the security level only if needed.

In contrast, combining the Matrix console adapter 26x and security isolator 610x into one unit reduces the number of components, reduced number of connectors and connecting cables, and optionally a smaller form factor (for example occupying a single bay in the rack.

To clearly point out the way the Matrix console adapter 26x and security isolator 610x were combined into a single-unit secure Matrix console adapter 2601x:

a) Components from the Matrix console adapter 26x retained their numbers and are within a dashed box 26';

b) Components from the security isolator 610x retained their numbers and are within a dashed box 610';

c) Thick lines 1001, 1002, 1003, 1004 shows the internal connection between dashed box 26' and dashed box 610'.

In the exemplary embodiment depicted here, where the audio channel is combined with the GP USB channel, the Audio processor function 38a and the standard audio codecs 40a may be spared.

Other components saving may be obtained for example by optionally combining host emulator 28a and device emulator 82x into a single chip. Other components saving may be obtained for example by optionally combining General-Purpose USB Host emulator function chipset 55b and GP USB device emulator function 113x into a single chip and optionally eliminate their redundant functionality.

FIG. 17 schematically illustrates a block diagram of a single secure Matrix console adapter 2602x, combining the functions of Matrix console adapter 26x and security isolator 610x, according to yet another exemplary.

To clearly point out the way the Matrix console adapter 26x and security isolator 610x were combined into a single-unit secure Matrix console adapter 2601x:

d) Components from the Matrix console adapter 26x retained their numbers and are within a dashed box 26";

e) Components from the security isolator 610x retained their numbers and are within a dashed box 610";

f) Thick lines 1001, 1002, 1003, 1004, 2005 and 206 shows the internal connection between dashed box 26" and dashed box 610".

g) Unidirectional signal flow enforcing devices 1007 and 1008 were inserted in the microphone and speaker lines respectively.

Similar arrangements may be used to combine the Matrix host adapter 3y and security isolator 610y to a single unit.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the disclosed subject matter, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

The invention claimed is:

1. A Secure KVM Matrix system comprising:
   at least one KVM Matrix fabric comprising:
   a plurality of inputs for communicating via at least one high-speed serial data stream with a corresponding host computer;
   a plurality of outputs for communicating via at least one high-speed serial data stream with corresponding peripheral devices, said peripheral devices comprising:
   a) Human Interface Devices (HID) selected from a group of a keyboard and a mouse, and
   b) a display,
   wherein said KVM matrix fabric is configured to route at least one of the plurality of inputs to one or more of the plurality of outputs;
   a plurality of matrix host adapters, wherein each of the matrix host adapters is connected to a corresponding one of the inputs of said KVM Matrix fabric, and wherein each one of said matrix host adapters is configured to convert peripheral devices interfaces data flowing to and from said corresponding host computer into one or more high-speed serial data streams compatible with said KVM Matrix fabric;
   a plurality of matrix console adapters, wherein each one of the matrix console adapters is connected to a corresponding one of the output of said KVM Matrix fabric, and wherein each one of said matrix console adapters is configured to convert peripheral device interfaces data flowing to and from said corresponding peripheral devices into one or more high-speed serial data streams compatible with the KVM Matrix fabric;
   a plurality of input security isolators, wherein each of the input security isolators is connected between the corresponding host computer and the corresponding matrix host adapter, and wherein each of the input security isolators is configured to enforce security data flow policy that is applicable for the corresponding host computer; and
   a plurality of output security isolators, wherein each of the output security isolators is connected between the corresponding peripheral devices and the corresponding matrix console adapter, wherein each of the output security isolators is configured to enforce security data flow policy that is applicable for the corresponding peripheral devices, wherein said input security isolator and said output security isolator, each further comprises a General Purpose USB channel, and wherein the General Purpose USB channels in said corresponding input security isolator and said output security isolator, each further comprises encryption/decryption function configured to create a secure tunnel between said corresponding input security isolator and said corresponding output security isolator which are coupled via said KVM Matrix fabric by authenticating both said corresponding security isolators and encrypting the USB packets between said corresponding security isolators.

2. The Secure KVM Matrix system of claim 1, wherein the input security isolators and the output security isolators are having the same block diagram.

3. The Secure KVM Matrix system of claim 2, wherein the input security isolators and the output security isolators are having the same hardware chipset.

4. The Secure KVM Matrix system of claim 3, wherein the input security isolators and the output security isolators are identical.

5. The Secure KVM Matrix system of claim 1, wherein the input security isolators and the output security isolators, each further comprises an EDID data diode to physically enforce video plug and play data to flow only from said corresponding display to said corresponding host computer.

6. The Secure KVM Matrix system of claim 1, wherein the output security isolators further comprise:
   a) an HID Host emulator to emulate a computer in front of the corresponding user HID devices; and
   b) an HID device emulator to emulate standard USB HID device in front of said corresponding matrix console adapter.

7. The Secure KVM Matrix system of claim 6, wherein said input security isolator further comprises:
   a) an HID Host emulator to emulate a computer in front of the corresponding matrix host adapters; and
   b) an HID device emulator to emulate standard USB HID device in front of said corresponding host computer.

8. The Secure KVM Matrix system of claim 7, wherein said input security isolator and said output security isolator further comprise an HID data diode connected between said HID host emulator and said HID device emulator to enforce HID data flow only from said HID host emulator to said HID device emulator.

9. The Secure KVM Matrix system of claim 1, wherein said input security isolator and said output security isolator, each further comprises a raw video data diode to physically enforce raw video data flow only from said corresponding host computer to said corresponding user peripherals.

10. The Secure KVM Matrix system of claim 7, wherein said General Purpose USB channel further comprises interface to the HID Host emulator to enable encryption/decryption of user HID data received by said General Purpose USB channel from said HID Host emulator.

11. The Secure KVM Matrix system of claim 1, wherein said General Purpose USB channel further comprises a USB audio CODEC to deliver audio data to and from said corresponding host computer through the KVM Matrix fabric over USB packets.

12. The Secure KVM Matrix system of claim 1, wherein said input security isolator and said output security isolator, each further comprises a management LAN interface to enable functions selected from the group comprising of: monitoring, configuration, automatic deployment warnings generation, pairing, and security keys distribution.

13. A Secure KVM Matrix system comprising:
   at least one KVM Matrix fabric comprising:
   a plurality of inputs for communicating via at least one high-speed serial data stream with a corresponding host computer;
   a plurality of outputs for communicating via at least one high-speed serial data stream with corresponding peripheral devices, said peripheral devices comprising:
   a) Human Interface Devices (HID) selected from a group of a keyboard and a mouse, and b) a display,
wherein said KVM matrix fabric is configured to route at least one of the plurality of inputs to one or more of the plurality of outputs;
a plurality of matrix host adapters,
wherein each of the matrix host adapters is connected to a corresponding one of the inputs of said KVM Matrix fabric, and wherein each one of said matrix host adapters is configured to convert peripheral devices interfaces data flowing to and from said corresponding host computer into one or more high-speed serial data streams compatible with said KVM Matrix fabric;
a plurality of matrix console adapters,
wherein each one of the matrix console adapters is connected to a corresponding one of the output of said KVM Matrix fabric, and
wherein each one of said matrix console adapters is configured to convert peripheral device interfaces data flowing to and from said corresponding peripheral devices into one or more high-speed serial data streams compatible with the KVM Matrix fabric;
a plurality of input security isolators, wherein each of the input security isolators is connected between the corresponding host computer and the corresponding matrix host adapter, and
wherein each of the input security isolators is configured to enforce security data flow policy that is applicable for the corresponding host computer; and
a plurality of output security isolators,
wherein each of the output security isolators is connected between the corresponding peripheral devices and the corresponding matrix console adapter,
wherein each of the output security isolators is configured to enforce security data flow policy that is applicable for the corresponding peripheral devices, and
wherein said input security isolator and said output security isolator, each further comprises a General Purpose USB channel configured to filter connected USB devices based on predefined USB device whitelist and blacklist.

14. A Secure KVM Matrix system comprising:
at least one KVM Matrix fabric comprising:
a plurality of inputs for communicating via at least one high-speed serial data stream with a corresponding host computer;
a plurality of outputs for communicating via at least one high-speed serial data stream with corresponding peripheral devices, said peripheral devices comprising:
a) Human Interface Devices (HID) selected from a group of a keyboard and a mouse, and
b) a display,
wherein said KVM matrix fabric is configured to route at least one of the plurality of inputs to one or more of the plurality of outputs;
a plurality of matrix host adapters,
wherein each of the matrix host adapters is connected to a corresponding one of the inputs of said KVM Matrix fabric, and wherein each one of said matrix host adapters is configured to convert peripheral devices interfaces data flowing to and from said corresponding host computer into one or more high-speed serial data streams compatible with said KVM Matrix fabric;
a plurality of matrix console adapters,
wherein each one of the matrix console adapters is connected to a corresponding one of the output of said KVM Matrix fabric, and
wherein each one of said matrix console adapters is configured to convert peripheral device interfaces data flowing to and from said corresponding peripheral devices into one or more high-speed serial data streams compatible with the KVM Matrix fabric;
a plurality of input security isolators, wherein each of the input security isolators is connected between the corresponding host computer and the corresponding matrix host adapter, and
wherein each of the input security isolators is configured to enforce security data flow policy that is applicable for the corresponding host computer; and
a plurality of output security isolators,
wherein each of the output security isolators is connected between the corresponding peripheral devices and the corresponding matrix console adapter, and
wherein each of the output security isolators is configured to enforce security data flow policy that is applicable for the corresponding peripheral devices,
wherein said input security isolators, said output security isolators, said matrix host adapters, and said matrix console adapters are formed as removable.

15. The Secure KVM Matrix system of claim 14, wherein:
at least one input security isolators is electrically and mechanically coupled to a matrix host adapter; and
at least one output security isolators is electrically and mechanically coupled to a matrix console adapter.

16. A Secure KVM Matrix system comprising:
at least one KVM Matrix fabric comprising:
a plurality of inputs for communicating via at least one high-speed serial data stream with a corresponding host computer;
a plurality of outputs for communicating via at least one high-speed serial data stream with corresponding peripheral devices, said peripheral devices comprising:
a) Human Interface Devices (HID) selected from a group of a keyboard and a mouse, and
b) a display,
wherein said KVM matrix fabric is configured to route at least one of the plurality of inputs to one or more of the plurality of outputs;
a plurality of matrix host adapters,
wherein each of the matrix host adapters is connected to a corresponding one of the inputs of said KVM Matrix fabric, and wherein each one of said matrix host adapters is configured to convert peripheral devices interfaces data flowing to and from said corresponding host computer into one or more high-speed serial data streams compatible with said KVM Matrix fabric;
a plurality of matrix console adapters,
wherein each one of the matrix console adapters is connected to a corresponding one of the output of said KVM Matrix fabric, and
wherein each one of said matrix console adapters is configured to convert peripheral device interfaces data flowing to and from said corresponding peripheral devices into one or more high-speed serial data streams compatible with the KVM Matrix fabric;
a plurality of input security isolators, wherein each of the input security isolators is connected between the corresponding host computer and the corresponding matrix host adapter, and
wherein each of the input security isolators is configured to enforce security data flow policy that is applicable for the corresponding host computer; and a plurality of output security isolators,
wherein each of the output security isolators is connected between the corresponding peripheral devices and the corresponding matrix console adapter, and
wherein each of the output security isolators is configured to enforce security data flow policy that is applicable for the corresponding peripheral devices,
an input security isolator and a matrix host adapter are integrated into a single unit formed as removable card; and
an output security isolator and a matrix console adapter are integrated into a single unit formed as removable card.

17. A Secure KVM Matrix system comprising:
at least one KVM Matrix fabric comprising:
a plurality of inputs for communicating via at least one high-speed serial data stream with a corresponding host computer;
a plurality of outputs for communicating via at least one high-speed serial data stream with corresponding peripheral devices, said peripheral devices comprising:
a) Human Interface Devices (HID) selected from a group comprising of
a keyboard and a mouse, and
b) a display,
wherein said KVM matrix fabric is configured to route at least one of the plurality of inputs to one or more of the plurality of outputs;
a plurality of matrix host adapters,
wherein each of the matrix host adapters is connected to a corresponding one of the inputs of said KVM Matrix fabric, and wherein each one of said matrix host adapters is configured to convert peripheral devices interfaces data flowing to and from said corresponding host computer into one or more high-speed serial data streams compatible with said KVM Matrix fabric;
a plurality of matrix console adapters,
wherein each one of the matrix console adapters is connected to a corresponding one of the output of said KVM Matrix fabric, and
wherein each one of said matrix console adapters is configured to convert peripheral device interfaces data flowing to and from said corresponding peripheral devices into one or more high-speed serial data streams compatible with the KVM Matrix fabric;
a plurality of input security isolators, wherein each of the input security isolators is connected between the corresponding host computer and the corresponding matrix host adapter, and
wherein each of the input security isolators is configured to enforce security data flow policy that is applicable for the corresponding host computer; and
a plurality of output security isolators,
wherein each of the output security isolators is connected between the corresponding peripheral devices and the corresponding matrix console adapter, and
wherein each of the output security isolators is configured to enforce security data flow policy that is applicable for the corresponding peripheral devices,
the output security isolators further comprise:
an HID Host emulator to emulate a computer in front of the corresponding user HID devices; and
an HID device emulator to emulate standard USB HID device in front of said corresponding matrix console adapter; and
said input security isolator further comprises:
an HID Host emulator to emulate a computer in front of the corresponding matrix host adapters; and
an HID device emulator to emulate standard USB HID device in front of said corresponding host computer,
wherein said General Purpose USB channel further comprises interface to the HID Host emulator to enable encryption/decryption of user HID data received by said General Purpose USB channel from said HID Host emulator,
wherein said HID device emulator is programmed to:
a) block all standard keyboard typing commands; and
b) pass all and only predefined special keyboard combination required to perform KVM Matrix commands.

18. The Secure KVM Matrix system of claim 17, wherein said HID device emulator is configured to be paired with, and authenticate only with specific USB devices based on serial numbers of said specific USB devices.

19. The Secure KVM Matrix system of claim 17, wherein said HID device emulator is configured to be paired with, and authenticate only with pre-qualified high security keyboard and mouse.

20. A method for securing a KVM Matrix system having at least one KVM Matrix fabric, wherein the at least one KVM matrix fabric includes a plurality of inputs for communicating via at least one high-speed serial data streams with a corresponding host computer; a plurality of outputs for communicating via at least one high-speed serial data streams with corresponding peripheral devices, said peripheral devices comprising: a) Human Interface Devices (HID) selected from a group of a keyboard and a mouse, and b) a display, wherein said KVM matrix fabric is configured to route at least one of said plurality of inputs to one or more of said plurality of outputs; a plurality of matrix host adapters, wherein each one of the matrix host adapters is connected to a corresponding one of the inputs of said KVM Matrix fabric, and wherein each one of the Matrix host adapters is configured to convert peripheral devices interfaces data flowing to and from said corresponding host computer into one or more high-speed serial data streams compatible with said KVM Matrix fabric; a plurality of matrix console adapters, wherein each one of the matrix console adapters is connected to a corresponding one of the output of said KVM Matrix fabric, and wherein each one of the matrix console adapters is configured to convert peripheral device interfaces data flowing to and from said corresponding peripheral devices into one or more high-speed serial data streams compatible with the said KVM Matrix fabric;
wherein the method comprises:
inserting a plurality of input security isolators, each of said input security isolators is connected between said corresponding host computer and said corresponding Matrix host adapter, wherein each of said input security isolators is configured to enforce security data flow policy that is applicable for said corresponding host computer, and
said input security isolators are formed as removable cards.

21. The method for securing a KVM Matrix system of claim 20, further comprising:
inserting a plurality of output security isolators, wherein each of the output security isolators is connected between said corresponding peripheral devices and said corresponding matrix console adapter, and wherein each of the output security isolators is configured to enforce security data flow policy that is applicable for said corresponding peripheral devices.

22. A security filter for securing a KVM Matrix system comprising:
- at least one host emulator; and
- at least one device emulator coupled to said at least one host emulator, wherein
- said security filter is configured to be connected between a host computer and a matrix host adapter,
- wherein the security filter is configured to enforce security data flow policy that is applicable for said host computer, and
- wherein said security filter is formed as a removable card.

23. A security filter for securing a KVM Matrix system comprising:
- at least one host emulator; and
- at least one device emulator coupled to said at least one host emulator,
- wherein the security filter is further constructed to be connected between peripheral devices and a matrix console adapter, and
- wherein the security filter is configured to enforce security data flow policy that is applicable for said corresponding peripheral devices, and
- wherein said security filter is formed as a removable card.

* * * * *